(12) United States Patent
Yokota et al.

(10) Patent No.: US 7,202,983 B2
(45) Date of Patent: Apr. 10, 2007

(54) IMAGE READING APPARATUS

(75) Inventors: Masahiko Yokota, Chiba (JP); Haruo Ishizuka, Chiba (JP); Tsuyoshi Yoshida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 868 days.

(21) Appl. No.: 10/222,823

(22) Filed: Aug. 19, 2002

(65) Prior Publication Data

US 2003/0038989 A1 Feb. 27, 2003

(30) Foreign Application Priority Data

Aug. 22, 2001 (JP) .............................. 2001-252099
Nov. 21, 2001 (JP) .............................. 2001-356247

(51) Int. Cl.
*H04N 1/04* (2006.01)
*H04N 1/00* (2006.01)

(52) U.S. Cl. ...................... 358/496; 358/498; 358/408; 358/474; 399/374; 399/367; 355/23

(58) Field of Classification Search ................ 358/496, 358/498, 497, 494, 505, 474, 401, 501, 482, 358/483, 512–514; 399/374, 364, 367; 382/312, 382/318, 319; 355/23–25
See application file for complete search history.

(56) References Cited

U.S. PATENT DOCUMENTS

| | | | | |
|---|---|---|---|---|
| 5,786,025 A | | 7/1998 | Saitou et al. ................ | 438/778 |
| 5,826,133 A | | 10/1998 | Saito et al. .................... | 399/2 |
| 5,951,002 A | | 9/1999 | Yokota ........................ | 271/117 |
| 5,986,775 A | * | 11/1999 | Yoshimizu .................. | 358/496 |
| 6,043,906 A | * | 3/2000 | Kikuchi ....................... | 358/475 |
| 6,640,082 B2 | * | 10/2003 | Mitomi ....................... | 399/374 |
| 6,859,636 B2 | * | 2/2005 | Mitomi ....................... | 399/367 |
| 2001/0033398 A1 | | 10/2001 | Chen .......................... | 358/498 |
| 2001/0043375 A1 | | 11/2001 | Yokota et al. .............. | 358/497 |
| 2002/0097450 A1 | | 7/2002 | Yokota et al. .............. | 358/474 |
| 2002/0109868 A1 | | 8/2002 | Yokota et al. .............. | 358/497 |

FOREIGN PATENT DOCUMENTS

| | | | |
|---|---|---|---|
| JP | 3-184462 | | 8/1991 |
| JP | 3-94868 | | 9/1991 |
| JP | 07193680 | | 7/1995 |
| JP | 10-126569 | | 5/1998 |
| JP | 11-69086 A | | 3/1999 |
| JP | 11-88594 | | 3/1999 |
| JP | 2928449 B2 | | 5/1999 |
| JP | 2000-307802 | | 11/2000 |
| JP | 2001-251474 | | 9/2001 |
| JP | 2001251474 A | * | 9/2001 |

* cited by examiner

*Primary Examiner*—Cheukfan Lee
(74) *Attorney, Agent, or Firm*—Fitzpatrick, Cella, Harper & Scinto

(57) ABSTRACT

In an image reading apparatus having a first original reading device for reading one side of an original guided and fed by a guide, and a second original reading device disposed downstream of the first original reading device for reading the other side of the original, the guide is bent between the first original reading device and the second original reading device so as to shield the respective reading devices. The bending of the guide is done by bending an original feeding path so that direct rays and diffraction rays from each of two light sources may not enter respective photoelectric transfer elements associated with other light source, to thereby shield the photoelectric transfer elements from light of a light source not associated therewith.

11 Claims, 11 Drawing Sheets

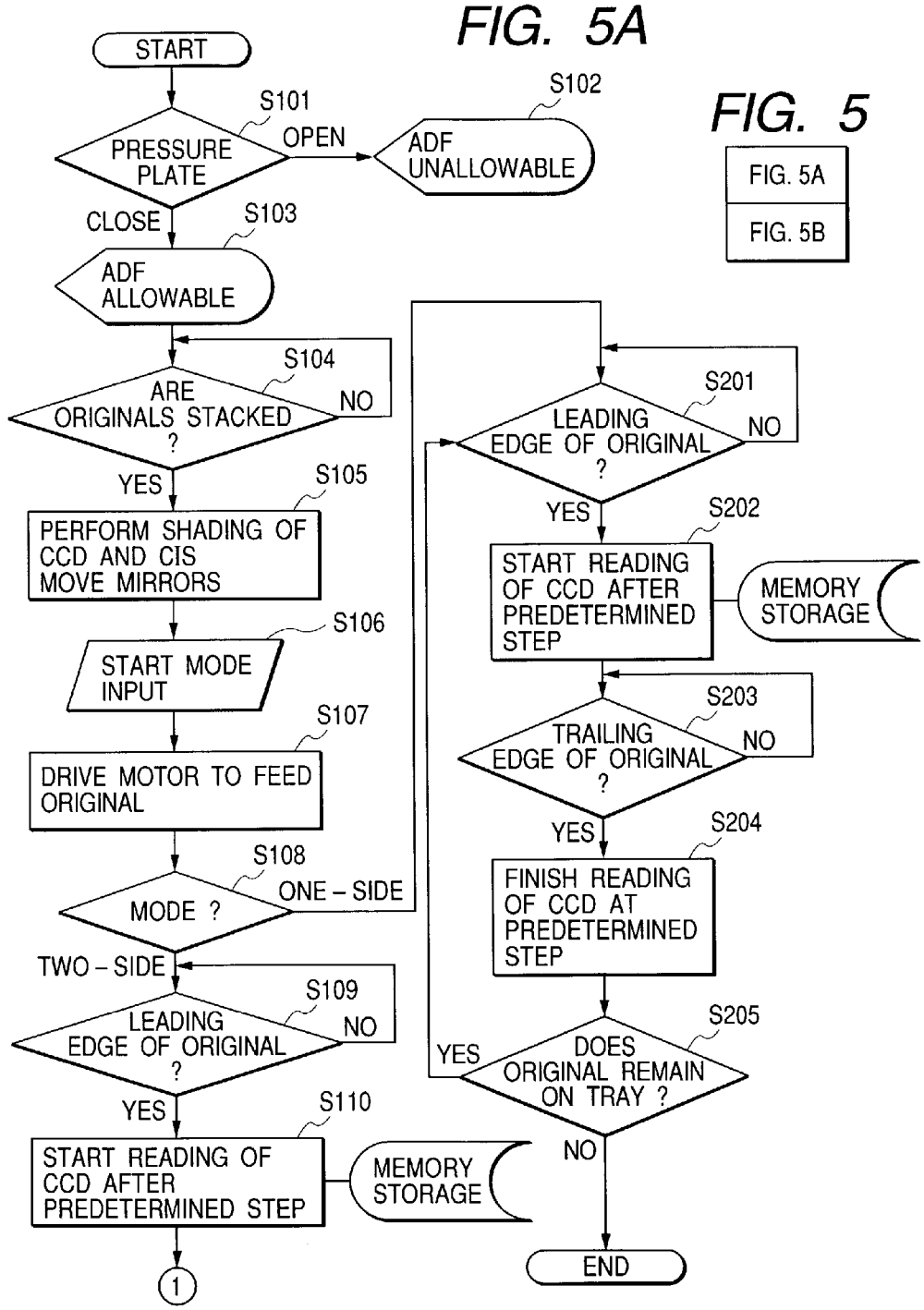

IMAGE READING APPARATUS

BACKGROUND OF THE INVENTION

1. Field of the Invention

The invention relates to an image reading apparatus, and a copying machine and a compound machine provided with the same.

2. Description of Related Art

When two-side images on an original are to be read at a time, the two sides are scanned at a time by image reading sensors having photoelectric transferring means disposed on the front side and back side, respectively, of the original, but in Japanese Patent Application Laid-Open No. 11-69086, there is proposed an apparatus for reading the two sides of an original substantially at a time. Also, in Japanese Patent No. 2928449, there is proposed an apparatus provided with two CCD reduction optical system reading means on the opposite sides of an original feed path and for reading the two sides of a moving original substantially at a time.

The apparatus of Japanese Patent Application Laid-Open No. 11-69086 does not have means for effecting the detection of the position of the original when the original is conveyed to image reading means and therefore, it is difficult to start the scanning by the two image reading means in conformity with the arrival position of the leading edge of the original. Therefore, the read image may become a defective image having a blank space which is not the image of the original on the leading edge or the trailing edge thereof, or delayed in reading timing.

Also, in the apparatus of Japanese Patent No. 2928449, the image reading means opposed to each other are proximate to each other and therefore, lights from respective light sources may enter sensors on opposite sides and cause the read image to deteriorate.

SUMMARY OF THE INVENTION

The present invention has been made in view of the above-noted points and has as its object to provide an image reading apparatus for reading two-side images at a time, for example, by both of an image sensor provided on a pressure plate side and a reduction optical system reading device provided on the main body side of the apparatus, and preventing the stray light of two light sources to thereby prevent the reading performance and the operability of jam removing from being spoiled.

In view of those points, the present invention solves the aforedescribed problems by the following construction.

The image reading apparatus according to the present invention is an image reading apparatus comprising:

first original reading means for reading one side of an original guided and conveyed by a guide; and second original reading means disposed downstream or upstream of the first original reading means for reading the other side of the original;

the guide being bent between the first original reading means and the second original reading means so as to shield the respective reading means.

Also, the bending of the guide may preferably be done by bending an original feed path so that direct rays and diffraction rays from two light sources may not enter respective photoelectric transfer elements, to thereby intercept the rays.

Also, the first original reading means, when it reads an original resting on an original glass stand, may preferably be moved in the sub-scanning direction to thereby scan the original.

The second original reading means may preferably be fixed upstream or downstream of the original feeding path with respect to a reading position at which the first original reading means is stopped when it reads a moving original.

The first original reading means may preferably be the image reading means of a reduction optical system using a photoelectric transfer element, or image reading means using a contact image sensor.

The second original reading means may preferably be the image reading means of a reduction optical system using a photoelectric transfer element, or image reading means using a contact image sensor.

The guide may preferably be formed with such a step that the downstream side thereof is higher between the first original reading means and the second original reading means, and the stepped portion may become a shielding portion.

As described above, according to the present invention, in an apparatus for reading the back side and front side of an original by two image reading means, images can be read without being affected by the stray light of respective light sources.

Also, the second original reading means is contained in a rigid member having a pivotal movement fulcrum perpendicular to the original feeding direction relative to a pressure plate, and original biasing means for the first original reading means is provided in the rigid member, whereby the original feed path near the first original reading means and the second original reading means can be opened by only one operation of pivotally moving the rigid member.

Also, by constructing the two original reading means so as to be parallel to each other, the feeding of the original in the sub-scanning direction can be made the same for the two reading means and therefore, the apparatus can be made small as compared with a system in which the sub-scanning direction is not the same direction.

DETAILED DESCRIPTION OF THE PREFERRED EMBODIMENTS

First Embodiment

Figure 1:
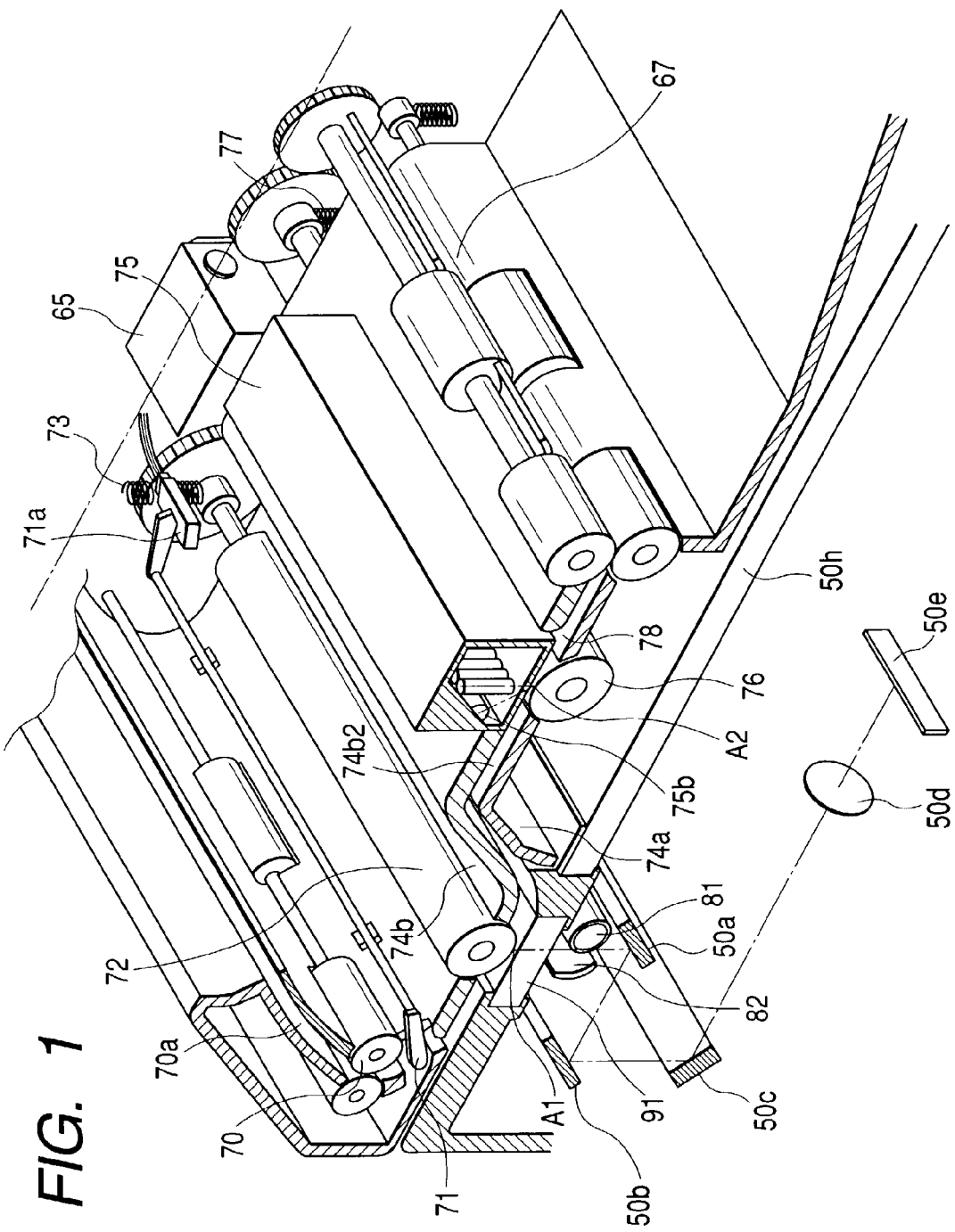
FIG. 1 is a perspective view including the cross section of a first embodiment.
Figure 2:
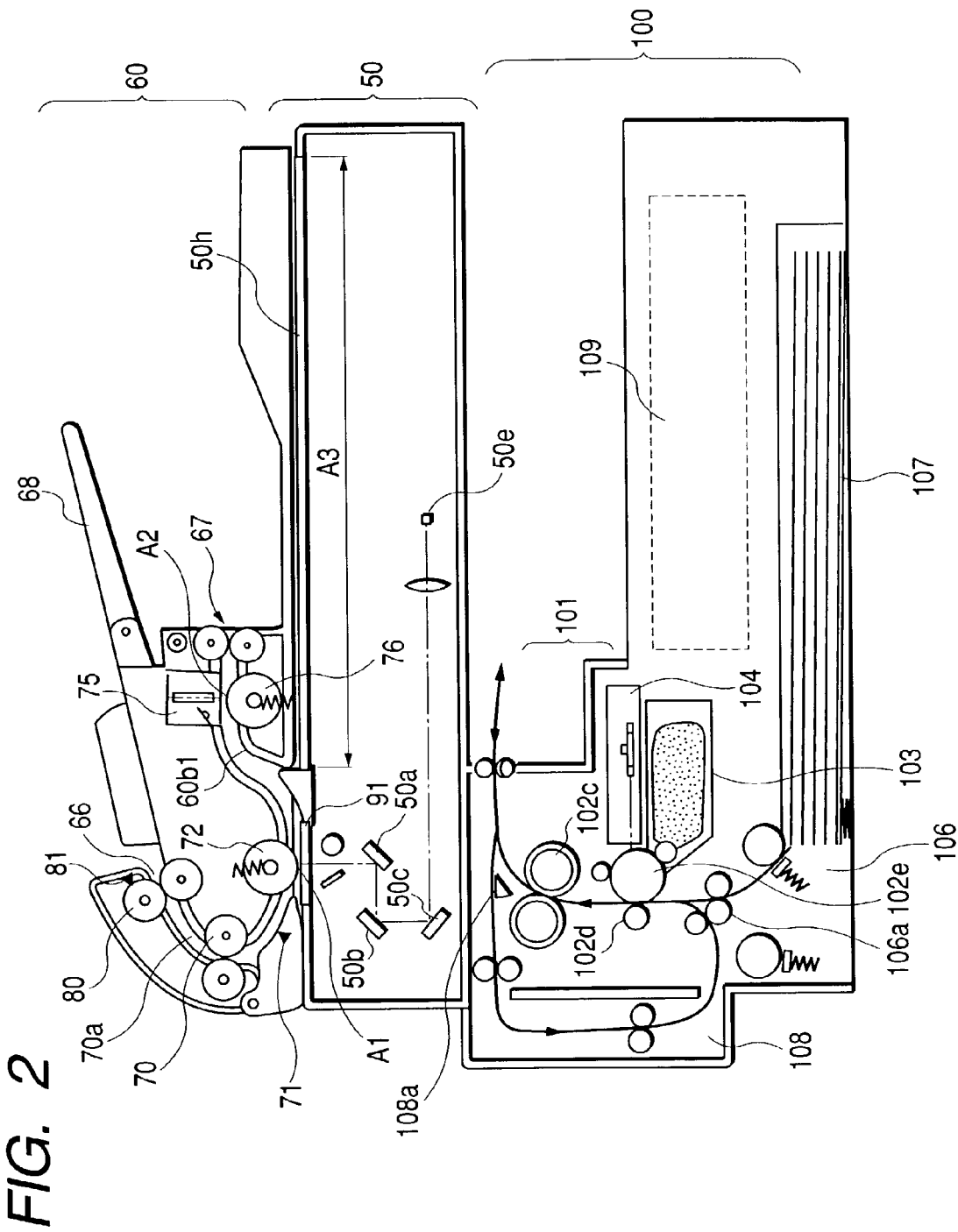
FIG. 2 is a cross-sectional view of a copying apparatus provided with the first embodiment.
Figure 3:
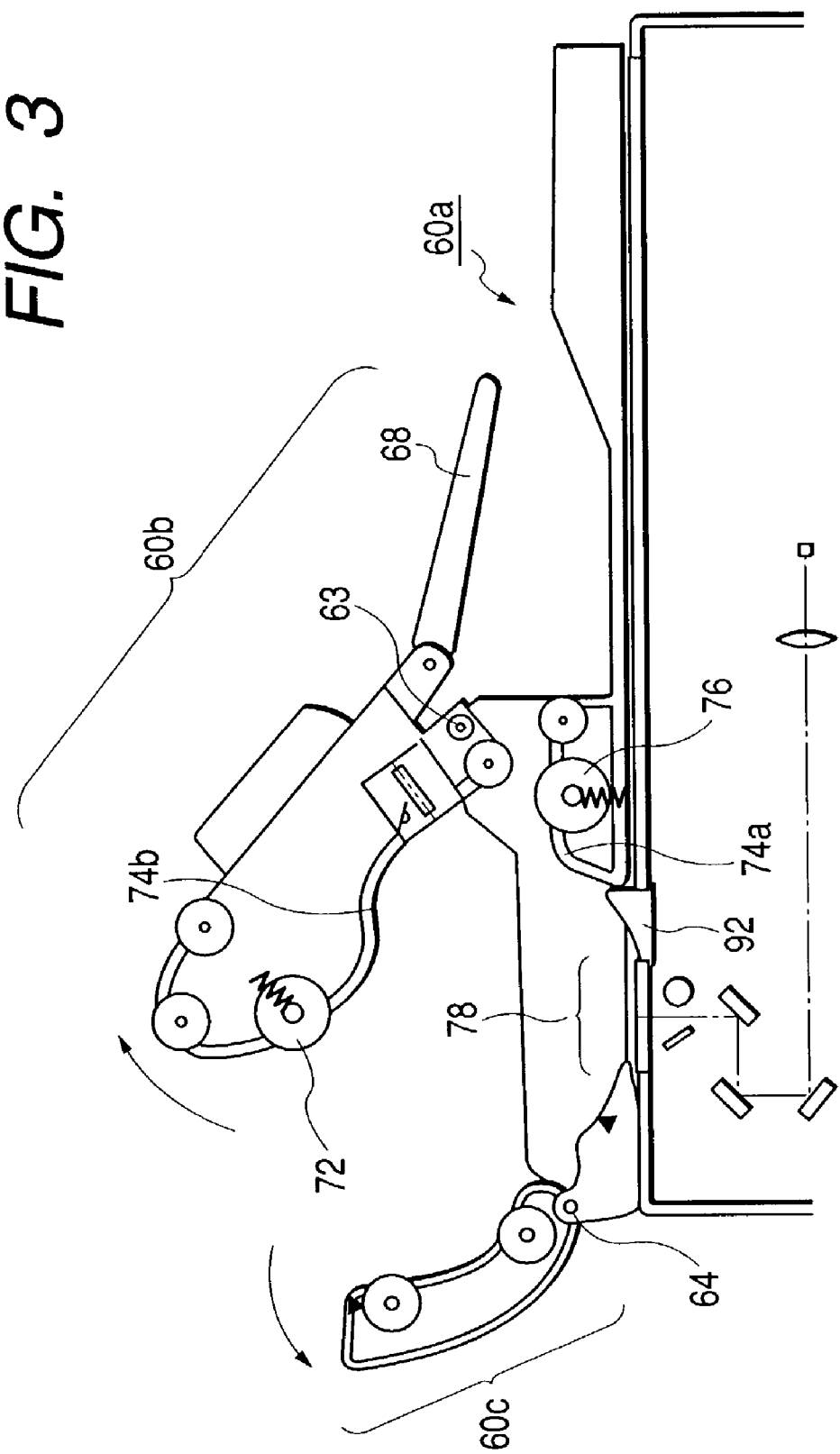
FIG. 3 is a schematic illustration of the first embodiment.

FIGS. 1 to 3 show a copying apparatus provided with the original reading apparatus of the present invention.

The apparatus of the present embodiment is provided with a so-called "book scanner portion" for placing a book original on an original glass stand 50h and moving an optical system to thereby effect sub-scanning and read the surface of the original, and a so-called "sheet scanner portion" provided with an original feeding device having a sheet separating mechanism above the original glass stand, and for effecting sub-scanning and reading (flow reading) the original while feeding a sheet original. Accordingly, as compared with such a case as seen in the conventional copying apparatus wherein an original is fed to a predetermined position, and thereafter is brought to a standstill and scanned, the scanning mechanism can be simplified and the reading time can be shortened.

The book scanner portion 50 is integral with the main body of the apparatus, and is provided with the original glass stand 50h on the uppermost portion thereof, and further above it, there is provided an original pressure plate portion 60 openably and closably mounted through a hinge 65 with the inner part side of the apparatus as a rotation reference.

The pressure plate portion 60 comprises three elements, which are an original pressure contact portion 60a for biasing the original placed on the original glass stand 50h, an original feeding portion 60b for feeding the sheet original, and a feed guide 60c constituting the outer peripheral side feed path of the original feeding portion 60b.

The sheet original feeding portion 60b is mounted for pivotal movement about a rotary shaft 63 perpendicular to the original feeding direction relative to the original pressure contact portion 60a.

The original feed guide 60c is also mounted for pivotal movement about a rotary shaft 64 perpendicular to the original feeding direction relative to the original pressure contact portion 60a.

With the original feed guide 60c and the original feeding portion 60b being closed, one continuous original feeding path is formed from an original supplying portion 66 to an original delivery portion 67.

In the original feeding portion 60b, there are an original stack tray 68 and original width regulating plates for aligning the opposite ends of a stack of originals.

A separating portion 80, an original feeding path 70a, an original registration roller 70 and an original edge detecting sensor 71 are provided in succession from the original supplying portion 66.

In the pressure contact portion 60a, an opening portion 78 is provided at a location past the original edge detecting sensor 71, and below this opening portion, there is flow reading glass 91 fixed to the main body side. The reference character 71a designates a photointerrupter for the original edge detecting sensor 71, and a first original pressure contact roller 72 is provided in the original feeding portion 60b, and the opposite ends of the roller 72 are biased toward the flow reading glass 91 by biasing springs 73.

The original passes between the first original pressure contact roller 72 and the flow reading glass 91, but when the operation is stopped or jam is caused in the course of original feeding, the original feed guide 60c and the original feeding portion 60b can be opened to thereby release the biasing force of the original pressure contact roller 72 and remove the original stagnating in the feed path.

A first original reading point A1 exists near the generatrix of the original pressure contact roller. An original jump stand 92 fixed also to the main body side exists downstream of the flow reading glass 91, and dips up the leading edge of the original having passed the original reading point A1 and guides it upwardly. The original dipped up enters an original feeding path 60b1 formed by the pressure contact portion 60a and the original feeding portion 60b.

A contact image sensor 75, also called a contact-type image sensor 75, is provided in the original feeding portion 60b at a location facing the original feeding path, and a second original pressure contact roller 76 is provided in that portion in the pressure contact portion 60a which is opposed to the close contact type image sensor 75.

The second original pressure contact roller 76 biases the opposite ends of the shaft thereof toward the contact image sensor 75 by biasing springs 77, and brings the passing original into close contact with the contact image sensor 75 to thereby constitute a second original reading point A2.

With the pivotal movement of the original feeding portion 60b about the rotary shaft 63, the contact image sensor 75 and the second original pressure contact roller 76 are spaced apart from each other and the biasing pressure is released, and the jammed original can be removed.

The rotary shaft 63 and the contact image sensor 75 are parallel to each other.

The opening portion 78 is constituted downstream of the second original reading point A2.

The image reading means of a 2:1 reduction optical system is constituted in the main body of the apparatus and below the flow reading glass 91 and the original glass stand 50h.

The reference numeral 81 designates a light source, the reference numeral 82 denotes a reflective troffer, the reference character 50a designates a first mirror, the reference character 50b denotes a second mirror, and the reference character 50c designates a third mirror.

When the light source 81 is right beneath the first image reading point A1, the opposed guide portions 74a and 74b of the original feeding path are curved into a convex shape and intercept light so that light from the light source may not become stray light and enter the contact image sensor 75. The original feeding path is S-shaped by this convex shape. That is, the guide portions 74a and 74b extend substantially in a longitudinal direction and intervene between the light source 81 and the sensor 75. Accordingly, the light passed to the pressure contact roller 72 side is blocked by the guide portion 74b, and the light passed into the path 60b 1 is blocked by the guide 74a.

Also, this S-shaped path functions to intercept the light from a light source (LED) 75b in the contact image sensor 75 so as not to arrive at the original reading point A1. That is, the light passed to the pressure contact roller 76 is blocked by the guide portion 74a, and the light passed into a horizontal path 74b2 is blocked by the guide portion 74b.

The book scanner portion 50 is provided with a CCD sensor 50e for photoelectrically transferring an original image obtained by scanning the original resting on the original glass stand 50h by the reflection of a mirror. The original placed on the original glass stand 50h is irradiated by the light source 81 and the reflective troffer 82 moved with a first mirror 50a so as to assume a predetermined luminosity. The original image is then reflected by a second mirror 50b and a third mirror 50c and enters a lens unit 50d, and enters the CCD sensor 50e through the lens unit 50d.

Figure 4:
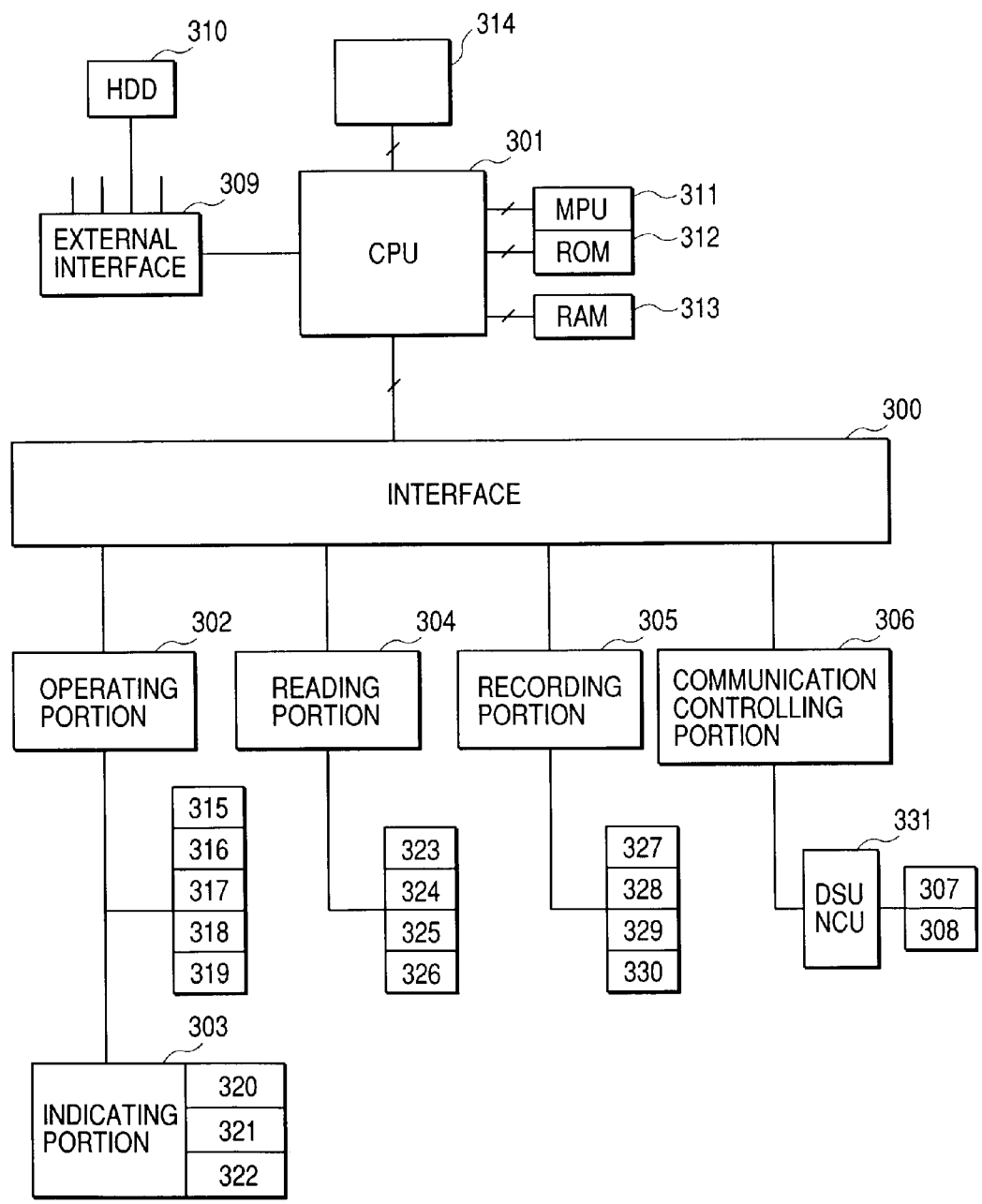
FIG. 4 is a block diagram of the control system of the first embodiment.

The original image is then photoelectrically transferred by this CCD sensor 50e and is sent as an electrical signal to an image processing portion (the CPU 301 of FIG. 4).

The first mirror 50a, when it is to read a stationary original, is moved within a range A3 just beneath the original glass stand 50h and reads the original. Also, when it is to read a sheet original stacked on the upper portion of the original pressure plate portion 60 while the sheet original is fed, the first mirror 50a is moved to and stopped at the position of the original reading point A1 and reads the original sent from the original feeding path 70a.

The separating portion 80 separates sheet originals one by one from a bundle of sheet originals stacked, and the thus separated sheet original is gripped by the original registration roller 70 so as to assume a constant speed and is sent toward the reading point A1.

Below the image reading portion 50, there is a recording portion 100 having a recording unit and an electrical equipment unit.

The reference numeral 107 designates a recording sheet cassette, the reference numeral 106 denotes a recording sheet feeding portion, the reference character 106a designates registration rollers, the reference numeral 103 denotes a toner container, the reference character 102e designates a photosensitive drum, the reference character 102d denotes a transfer roller, the reference numeral 104 designates a laser scanner unit, the reference character 102c denotes a fixing roller, the reference character 108a designates an inverter flapper for back side recording, the reference numeral 108 denotes a recording sheet inverting path, and the reference numeral 101 designates a recording sheet delivery portion for delivering recording sheets in their face down state from the relation with the sheet path and the transfer roller, as shown.

With the flapper 108a as a dividing point, a recording sheet being delivered toward the sheet delivery portion 101 is switched back, whereby the recording sheet is reversely fed to the recording sheet inverting path. This recording sheet is refed via the registration rollers 106a, and an image is formed on the back side thereof via the transfer roller 102e.

FIG. 4 shows a block diagram of the control system of the entire apparatus. This control system is contained in the electrical equipment portion 109 of the main body.

An external interface 309 is provided with the CPU 301 as the center, and a high capacity fixed magnetic disk 310, RS232C and a serial interface can be connected together. Thereby, the present apparatus becomes connectable as the peripheral apparatus of a computer, and can also be utilized as an image scanner, a local printer or a network printer.

An internal interface 300 has an operating portion 302, an indicating portion 303, a reading portion 304, a recording portion 305 and a communication controlling portion 306. The reading portion 304 is constituted by a fixed-reading portion 304a and a movable fixed-reading portion 304b, and the fixed-reading portion 304a has a sheet scanner controlling portion 323 and a book scanner controlling portion 324. The reference numeral 311 designates an MPU, the reference numeral 312 denotes a ROM, and the reference numeral 313 designates a RAM.

Figure 5B:
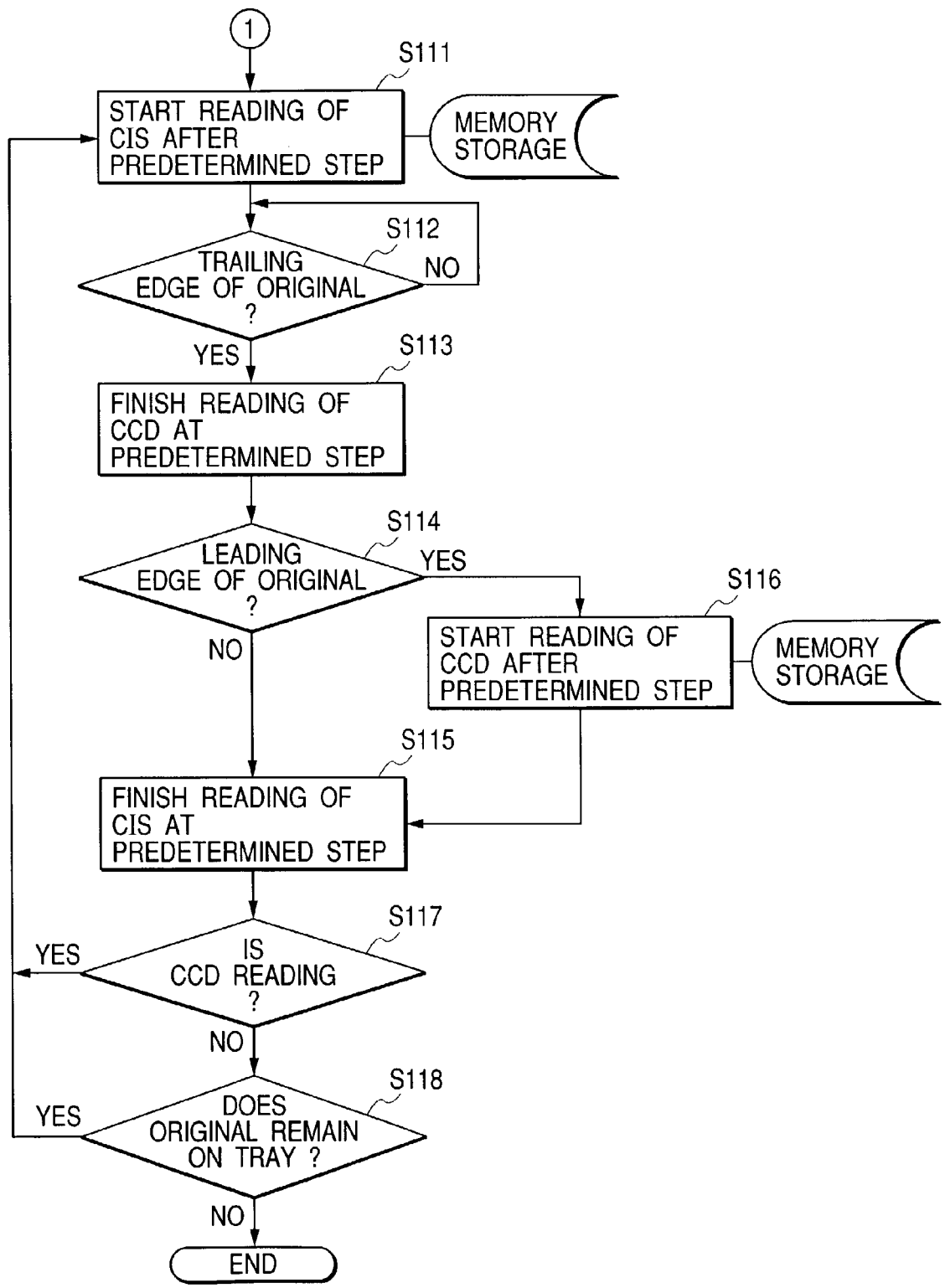
FIG. 5 is comprised of FIGS. 5A and 5B showing flow charts of the operation of the first embodiment.

The operation of the present apparatus will now be described with reference to FIGS. 5A and 5B. In FIGS. 5A and 5B, CIS refers to the contact image sensor.

S101: The opened and closed states of the pressure plate 60 are detected. When the pressure plate 60 is in its opened state, the operation of the ADF comprised of the original feeding portion 60b and the feed guide 60c is inhibited (S102). At this time, control is effected so as to effect only the reading of the original on the original glass stand 50h. The original reading range A3 is scanned by the mirrors 50a–50c and the CCD 82.

S103: When the pressure plate 60 is in its closed state, the use of the ADF is allowed and the apparatus stands by.

S104: When the original S is inserted into the original supplying portion 66, the original detecting sensor 81 detects the pressure of the original. The original is inserted with the first page facing down.

S105: The shading of the contact image sensor 75 and the CCD 82 is performed, and the mirrors 50a–50c are moved and stand by at a position whereat the scanning at the original reading point A1 becomes possible.

S106: The user performs the setting of the two-side or one-side reading mode and reading magnification from the operating portion (not shown).

S107: An original feeding motor (not shown) is driven to thereby feed the original toward the reading point A1. The rotational speed of the motor is proportional to the reading magnification. A stepping motor is utilized as the motor, and in an apparatus wherein the motor feeds at 600 pps when for example, the original is read at 100% magnification, the motor is driven at 1200 pps for 50% reduction to thereby change the sub-scanning speed. In the main scanning, enlargement and reduction are effected by the bit thinning and interpolation of data.

S108: The operation differs depending on the two-side mode or the one-side mode.

S109: The coming-in of the leading edge of the original is waited for.

S110: When the leading edge of the original is detected by the original edge detecting sensor 71, the number of motor steps corresponding to the distance over which the leading edge arrives at the reading point A1 is counted, and the reading by the CCD 82 is started. This number of steps is stored in a nonvolatile memory 312 in advance, and one step of the motor and the amount of feed of the original are constant irrespective of the speed and therefore, irrespective of the magnification, the initial feed of the original is possible at one count number for all magnifications.

The images read at the original reading point A1 are successively photoelectrically transferred and accumulated in the memory. The CCD 82 reads the front side of the original, i.e., the odd number page in the case of a two-side original.

S111: Also at the original reading point A2, the number of steps of the motor is counted by an amount corresponding to the distance from the original edge detecting sensor 71 and the reading by the contact image sensor 75 is started. These images are likewise successively photoelectrically transferred and the image data are accumulated in the nonvolatile memory 312. The contact image sensor 75 does not perform reading in the case of the one-side mode, but performs the reading of the back side, i.e., the even number page, of the original in the case of the two-side mode.

S112: The trailing edge of the original is detected by the original edge detecting sensor 71, and when at a predetermined step, the edge portion of the original arrives at the reading point A1, the image reading by the CCD 50e is finished (S113). At this time, the reading of the even number page by the contact image sensor 75 is still performed.

S114: When the original edge detecting sensor 71 detects the next original before the reading by the contact image sensor 75 is finished, as at S111, the feed of the original is counted by an amount corresponding to the predetermined step, whereafter the front side of the next original is read by the CCD 50e (S116).

S115: After the original has been fed by the amount corresponding to the predetermined step from the detection of the trailing edge of the first original, that is, when the trailing edge of the original has completely passed the original reading point A2, the reading of the even number page by the contact image sensor 75 is finished.

S117: When the CCD is in its reading state, it enters the reading state for the next original and therefore, without the necessity of waiting for the original edge detection, the reading of the even number page of the next sheet by the contact image sensor 75 is performed from a predetermined count number (return is made to S111).

S118: When the original becomes absent on the original tray 68, that is, when it is detected by the original detecting sensor 81 that no original is present, the operation is terminated after the original has been delivered.

In the case of the one-side mode, the operation goes as follows.

S201: The entry of the leading edge of the original is waited for.

S202: When the leading edge of the original is detected by the original edge detecting sensor 71, the number of motor steps corresponding to the distance over which the leading edge arrives at the reading point A1 is counted, and the reading by the CCD 50e is started. Image data are accumulated in the memory 313.

S203: When the trailing edge of the original is detected by the original edge detecting sensor 71 and the edge portion of the original arrives at the reading point A1 at a predetermined step, the reading by the CCD 50e is finished (S204).

S205: When the original becomes absent on the original tray 68, that is, when it is detected by the original detecting sensor 81 that no original is present, the operation is terminated after the original has been delivered.

The data sending order will hereinafter be described. As regards image data, it is to be understood that the front side of the first original is represented as 1a, the back side thereof is represented as 1b, the front side of the second original is represented as 2a, the back side thereof is represented as 2b, . . . .

In the case of a facsimile apparatus or an image scanner, encoded image data are sent in the order of pages. When two-side originals are read, the order is 1a, 1b, 2a, 2b, 3a, 3b, . . . .

In the case of copying, the order differs depending on a method of delivering recording sheets and a duplex inverter mechanism. The delivering method includes the face-up method and the face-down method, and the duplex inverter mechanism includes the internal stack type and the successive inverting type. The internal stack type is a type which enables one or more recording sheets to stay in a recording sheet inverting portion 108, and the successive inverting type is a type in which shift is made to the recording operation for the back side without the recording sheet being made to stay in the recording sheet inverting portion 108.

The case of the face-up method and the internal stack type; In the case of an apparatus in which the number of internally stacked sheets is two, to deliver two-side copies in the order of pages, when for example, five sheets of originals are to be two-side-copied, the recording order becomes 5b, 4b, 3b, 5a, 2b, 4a, 1b, 3a, 2a and 1a.

The case of the face-up method and the successive inverting type: When also five sheets of originals are to be two-side-copied, the recording order becomes 5b, 5a, 4b, 4a, 3b, 3a, 2b, 2a, 1b and 1a.

The case of the face-down method and the internal stack type: In the case of an apparatus in which the number of internally stacked sheets is two, to deliver two-side copies in the order of pages, when for example, five sheets of originals are to be two-side-copied, the recording order becomes 1b, 2b, 3b, 1a, 4b, 2a, 5b, 3a, 4a and 5a.

The case of the face-down method and the successive inverting type: When also five sheets of originals are to be two-side-copied, the recording order becomes 1b, 1a, 2b, 2a, 3b, 3a, 4b, 4a, 5b and 5a.

Each operation will hereinafter be described in greater detail.

In an image reading apparatus having first original reading means for reading an original resting on an original glass stand while moving in the sub-scanning direction, and original feeding means for reading an image by stationary second image reading means while moving the original, a sensor for detecting the leading edge and trailing edge of the original is provided further upstream of original reading means upstream of an original feeding path, and when the image of a moving original is to be read by the second image reading means, the image on the opposite side of the original is read by the first original reading means with the reading means operated earlier, and the original reading means located on the downstream side is started to operate in conformity with the original feeding position to thereby read the opposite side of the original with a time difference.

In this construction, a single original edge portion detecting sensor acts to control the scanning starting and ending timing of the two reading means differing in reading position from each other.

The aforementioned time difference is set in accordance with the number of steps when the stepping motor of the original feeding apparatus feeds the original from the upstream original reading position to the downstream reading position.

In the present construction, the single original edge portion detecting sensor acts to control the scanning starting and ending timing of the two reading means differing in reading position from each other by the counting of the pulse number.

In an image reading apparatus having first original reading means for reading an original resting on an original glass stand while moving in the sub-scanning direction, and original feeding means for reading an image by stationary second image reading means while moving the original, provision is made of means for biasing the original at the reading position when a moving original is read by the first reading means, and second original reading means is provided in the same rigid member as a rigid frame to which the biasing means is attached, and an original feed guide opposed to the reading surface of the second original reading means is provided for pivotal movement relative to the same rigid member as a pressure plate through the center of rotation parallel to the second original reading means.

In this construction, the second original reading means and the original feeding path can be freely spaced apart from each other to thereby enable the original staying or jammed in the feeding path to be simply removed.

The rigid member is provided with original feeding and supplying means, and original separating means and original feeding rollers are provided so that the separation of the original and the feeding of the original may become possible when the feed guide is held at a predetermined height relative to second original feeding means, and an opening portion parallel to the main scanning direction of the first original reading means is provided in the original feed guide which is a portion of the interior of the rigid member and leads to the second original reading means, and glass serving also as the guide for original feeding is provided between the opening portion and the first original reading means and the original is read.

In this construction, the first original reading means reads the image of the moving original through the glass and the opening portion.

A bent portion for intercepting direct light and diffracted light from the light sources of the two reading means and the reflected light from the guide is provided on the rigid member between the first original reading means and the second original reading means or a rotatable original feed guide when the first original reading means is below the opening portion, and the design is made such that the original can be fed in accordance with this bent portion.

In this construction, the diffracted light from the two light sources and the reflected light are intercepted by the bent portion, and the original is fed along the bent portion.

In an image reading apparatus having first original reading means for reading an original resting on an original glass stand while moving in the sub-scanning direction, and original feeding means for reading the image of the original by stationary second original reading means while moving the original, the first original reading means and the second original reading means are disposed in parallel to each other.

In this construction, the sub-scanning direction of the moving original can be determined to only one direction.

The second original reading means is provided in the same rigid member as a pressure plate for biasing an original placed on an area in which the first original reading means scans the stationary original while moving, and a rotary shaft perpendicular to the main scanning direction of the second original reading means is provided in a pressure plate rigid member, and is mounted for pivotal movement perpendicularly to the main scanning direction of the first original reading means relative to a housing in which the first original reading means is present.

In this construction, the rotary shaft pivotally operates perpendicularly to the main scanning direction of the first original reading means relative to a fluid in which the first original reading means is present.

A bent portion for intercepting direct and diffracted light from the light sources of the two reading means and reflected light from the guide is provided on the rigid member between the first original reading means and the second original reading means or a rotatable original feed guide when the pressure plate rigid member is pivotally moved and is joined to the housing having the first original reading means, and the design is made such that the original can be fed in accordance with this bent portion.

In this construction, diffracted light from the two light sources and reflected light are intercepted by the bent portion, and the original is fed along the bent portion.

Other Embodiments of the Present Invention

In the above-described embodiment, an original reading apparatus using a U-turn path has been taken as an example, but the present invention may be applied to an original reading apparatus using a straight path. Also, the original glass stand and the flow reading glass may be made integral with each other, and the flow reading glass may be provided on the original feeding device side.

The present invention may be applied to a system comprised of a plurality of apparatuses (e.g. a host computer, an interface apparatus, a reader, a printer, etc.) or a system comprising a single apparatus.

The scope of the present invention also covers an apparatus for supplying the program code of software for realizing the function of the afore-described embodiment to a computer in an apparatus or a system connected to various devices to operate the various devices so as to realize the function of the aforedescribed embodiment, and operating the various devices in accordance with a program stored in the computer (CPU or MPU) in the system or the apparatus to thereby carry out the invention.

Also, in this case, the program code itself of the aforementioned software realizes the function of the afore-described embodiment, and the program code itself and means for supplying the program code to the computer, for example, a storage medium storing such a program code therein constitute the present invention. As the storage medium for storing such a program code therein, use can be made, for example, a floppy (R) disk, a hard disk, an optical disk, a magneto-optical disk, a CD-ROM, a magnetic tape, a nonvolatile memory card, a ROM or the like.

Also, the computer executes the program code supplied thereto, whereby not only the function of the aforedescribed embodiment is realized, but of course, such a program code is covered by the embodiment of the present invention when the function of the aforedescribed embodiment is realized jointly by an OS (operating system) or other application software in which the program code works in the computer.

Also, the present invention can of course be applied to the image reading means of a reduction optical system using a photoelectric transfer element.

Further, the present invention of course covers a case where the supplied program code is stored in a memory provided in the function extender board of the computer or a function extender unit connected to the computer, whereafter on the basis of the instructions of the program code, a CPU or the like provided in the function extender board or the function extender unit performs part or the whole of actual processing, and the function of the aforedescribed embodiment is realized by the processing.

Figure 6:
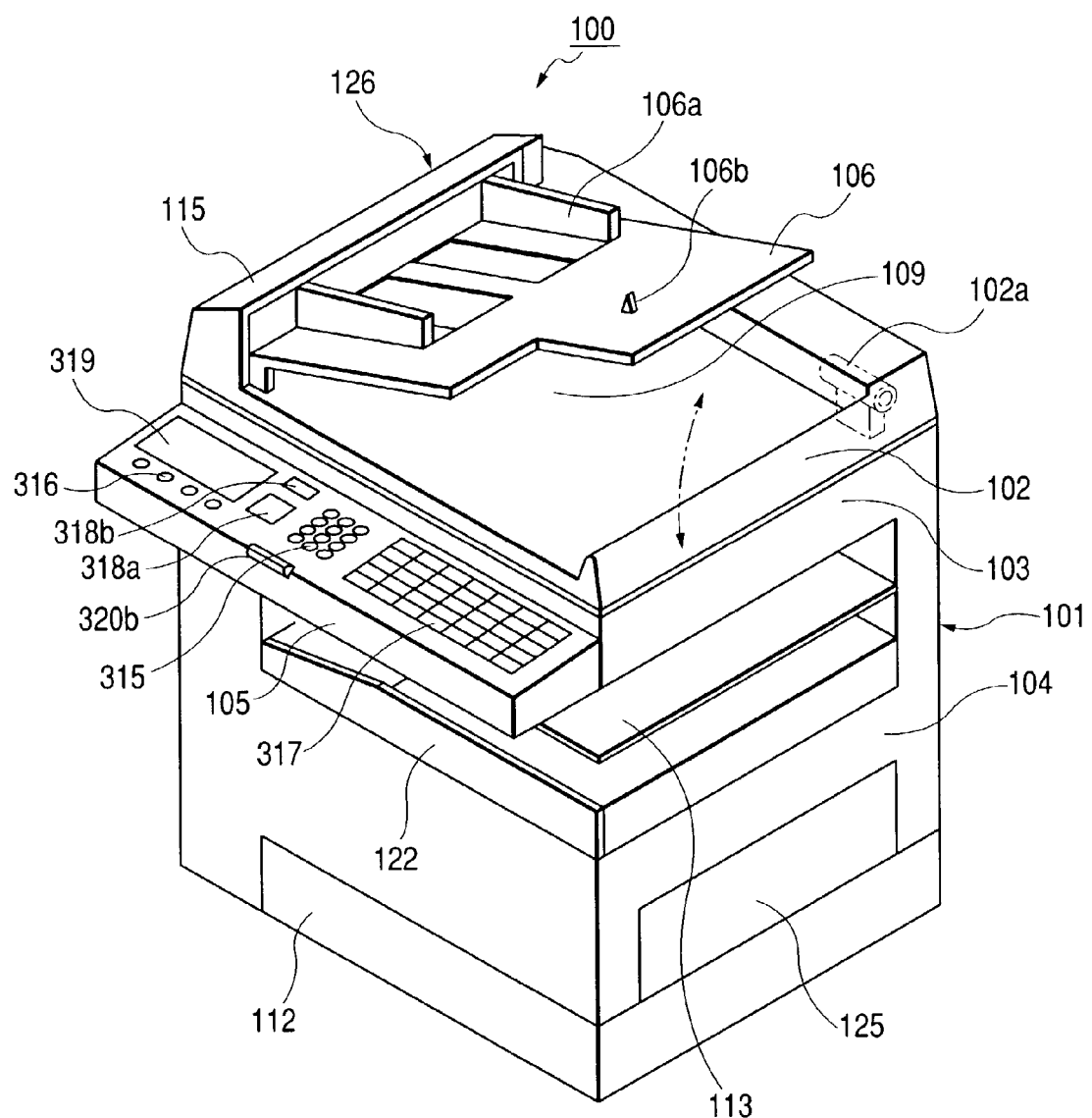
FIG. 6 is a pictorial perspective view of a facsimile apparatus which is an image forming apparatus provided with an image reading apparatus according to a second embodiment of the present invention in the main body of the apparatus.

An image reading apparatus which is a second embodiment of the present invention and a facsimile apparatus which is an image forming apparatus provided with this image reading apparatus in the main body of the apparatus will now be described with reference to FIG. 6. The facsimile apparatus of the present embodiment also has the function as a copying machine.

Image forming apparatus include a facsimile apparatus, a digital copying machine and a scanner printer and a compound machine of these. An original reading apparatus is adapted to be provided not only in a facsimile apparatus, but also in a copying apparatus, a printer or the like.

The facsimile apparatus 100 has an image reading apparatus 126 provided in the upper portion of the main body 101 of the facsimile apparatus 100, and an electrophotographic printer 127 provided in the main body 101 of the apparatus.

(Image Reading Apparatus)

The image reading apparatus 126 has an automatic original feeding device (ADF(auto document feeder)) 128 and an image reading portion 103. The automatic original feeding device (hereinafter referred to as the "ADF") 128 is adapted to automatically feed originals one by one to the image reading portion 103. The image reading portion 103 is adapted to read the original fed thereto by the ADF 128.

An ADF pressure plate 102 is openably and closably provided in the main body 101 of the apparatus, and is adapted to stack a plurality of sheet originals D thereon and separate and feed them one by one. The sheet originals are sheets on which characters, pictures, symbols, etc. (hereinafter referred to as the "image") are formed.

An original stacking stand 106 is a tray on which sheet originals are placed by the user. The image reading portion 103 is adapted to read the surfaces of the sheet originals D and the image information of a book original on an original glass stand 107. The original glass stand 107 includes not only so-called true glass, but also a synthetic material resembling glass. An ADF separating portion 115 is adapted to prevent the double-feed of the sheet originals on the original stacking stand 106 and introduce the sheet originals one by one from the original stacking stand 106. A sheet original feeding portion 121 is adapted to feed the sheet originals introduced by the ADF separating portion 15 to the downstream side. A back side reading sensor portion 116 is adapted to read the back side of a sheet original when images are formed on the two sides of the sheet original. An original delivery portion (delivery means) 117 is a portion for stacking thereon sheet originals which have been read. An original presser plate 118 is adapted to press the book original against the original glass stand 107.

The image reading portion 103 is adapted to read the surface of the sheet original D and the image information of the book original on the original glass stand 107. A movable type image sensor portion (first image reading means) 108 is adapted to read the images on sheet originals successively fed to the sheet original passing surface 109d of the flow reading glass 109 while remaining at a standstill. The movable type image sensor portion 108 is adapted also to be capable of reading the images on the sheet originals and the book original placed on the original glass stand 107 while being moved. An operating portion 105 for the user to operate the entire facsimile apparatus 100 is provided outside the image reading portion 103. The operating portion 105 is provided with an indicating portion, an input key, etc.

The reading of the book original will now be described.

The ADF pressure plate 102 is pivotally mounted on the image reading portion 103 by hinge portions 102a. The hinge portions 102a are disposed on the right and left of the back side of the image reading portion 103 (the left side being not shown) and can be opened and closed by the user raising this side of the ADF pressure plate 102. Each hinge portion 102a is designed, when the user opens the ADF pressure plate 102 at a predetermined angle (e.g. about 70–) by a combination of a damper, a cam, a spring member, etc., to be capable of maintaining the opened state thereof. With the ADF pressure plate 102 opened, sheet originals or a book original can be set on the original glass stand 107.

The movable type image sensor portion 108 is adapted to apply light from a light source comprising an LED and a light conducting member made of resin or the like to the image on the sheet original or the book original, and cause reflected light reflected by the image to be imaged on a one-dimensional sensor element array by a SELFOC lens (trademark) and read the image.

The movable type image sensor portion 108 is adapted to be moved to right and left in the facsimile apparatus along a rail (not shown) to a desired position by a driving wire 103a, a pair of driving pulleys 103b, a driving motor (not shown), and so on. The movable type image sensor portion 108 can be moved at a uniform speed to thereby read the image on the sheet original or the book original placed on the original glass stand 107 in a predetermined range from a book reading range starting position 107a to a book reading range ending position 107b.

A white sheet 109c is disposed on the underside of a jump stand 109b overhanging on the upper portion of the original glass stand 107. The movable type image sensor portion 108 is adapted to be capable of effecting shading compensation when the reading position is below the white sheet 109c. When book scanning is to be effected, the movable type image sensor portion 108 passes below the jump stand 109b during each cycle of scanning and therefore, can effect shading compensation each time. This is effective to decrease the influence of the light source of the movable type image sensor portion 108 whose quantity of light varies in conformity with the turn-on time thereof.

The original presser plate 118 is formed by white sheets, sponges or the like being laminated, and prevents the sheet originals or the book original placed on the original glass stand 107 from floating up. The original presser plate 118 has its left end 118a extended to the left side of the book reading range starting position 107a and has its right end 118b extended to the right side of the book reading range ending position 107b.

A description will now be provided of the reading of the surfaces of the sheet originals D.

The ADF separating portion 115 is comprised of a pickup roller 115a disposed so as to be moved up and down by an actuator (not shown), a separating roller 115b, a retard roller 115c brought into pressure contact with the separating roller 115b and rotatable by the separating roller 115b and adapted to be rotated in the opposite direction to thereby prevent double-feed when sheet originals are likely to be double-fed.

The pickup roller 115a is moved down and presses the sheet originals D stacked on the original stack stand 106 with their front sides facing upwardly, and feeds the sheet original into between the separating roller 115b and the retard roller 115c. The retard roller 115c and the separating roller 115b cooperate with each other to separate the sheet originals one by one and feed them to the downstream side. Separating and feeding runners 121a, 121b biased toward a reading and feeding roller 121c by a pressure spring (not shown), and the reading and feeding roller 121c cooperate with one another to feed the sheet original to a U-turn sheet path 129 along an original guide 121d, and feed it to the flow reading glass 109.

A sheet original pressure plate 121e biased toward the flow reading glass 109 by a biasing spring (not shown), presses the sheet original D against the flow reading glass 109 and brings the sheet original D into close contact with the flow reading glass 109. At this time, the movable type image sensor portion 108 is moved to a sheet original reading position 109a. The sheet original passes over the sheet original reading position 109a. The movable type image sensor portion 108 reads the image on the surface of the sheet original D.

The jump stand 109b guides the sheet original D to the ADF pressure plate 102 side. A reading and feeding runner 121f biased toward a reading and feeding roller 121c side by a pressure spring and the reading and feeding roller 121c feed the sheet original and further, delivery runners (a pair of rotary members) 117a biased toward delivery rollers 117b side by a pressure spring (not shown), and the delivery rollers (a pair of rotary members) 117b deliver the original to an original delivery tray 117c.

A reading finish stamp (stamping means) 121g is disposed upstream of the delivery rollers 117b. The reading finish stamp 121g stamps a reading finish mark on the surface of the sheet original D.

A description will now be provided of the reading of the back side of the sheet original D.

A back side reading sensor portion (second image reading means) 116 comprises a fixed contact image sensor (reading sensor portion) 116a and a sheet original pressure portion 116b for pressing the sheet original D against the contact image sensor 116a and bringing it into close contact with the latter, and is adapted to read the back side of the passing sheet original D.

Figure 8:
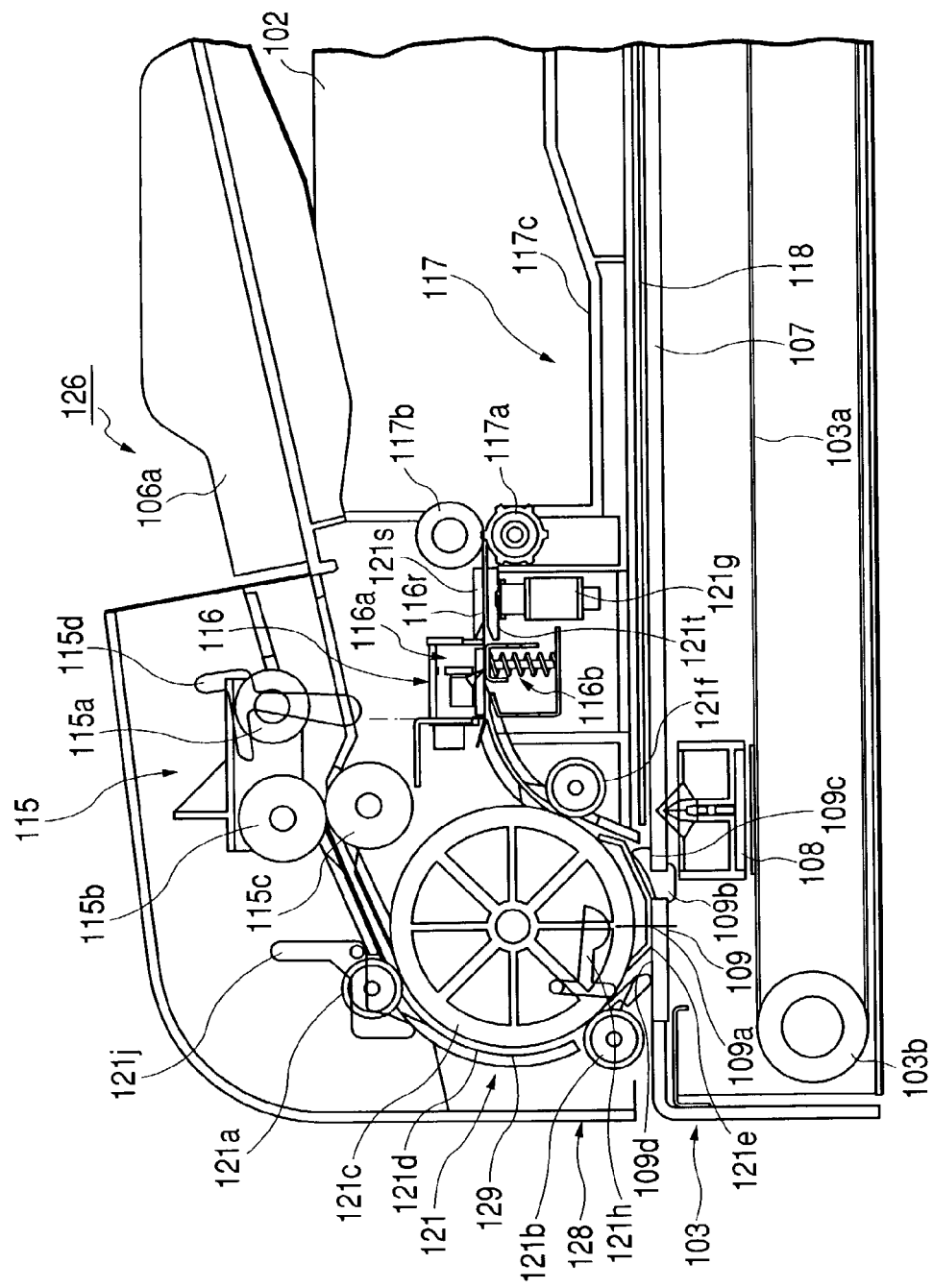
FIG. 8 is a fragmentary enlarged view of the image reading apparatus provided in the facsimile apparatus of FIG. 6.
Figure 10:
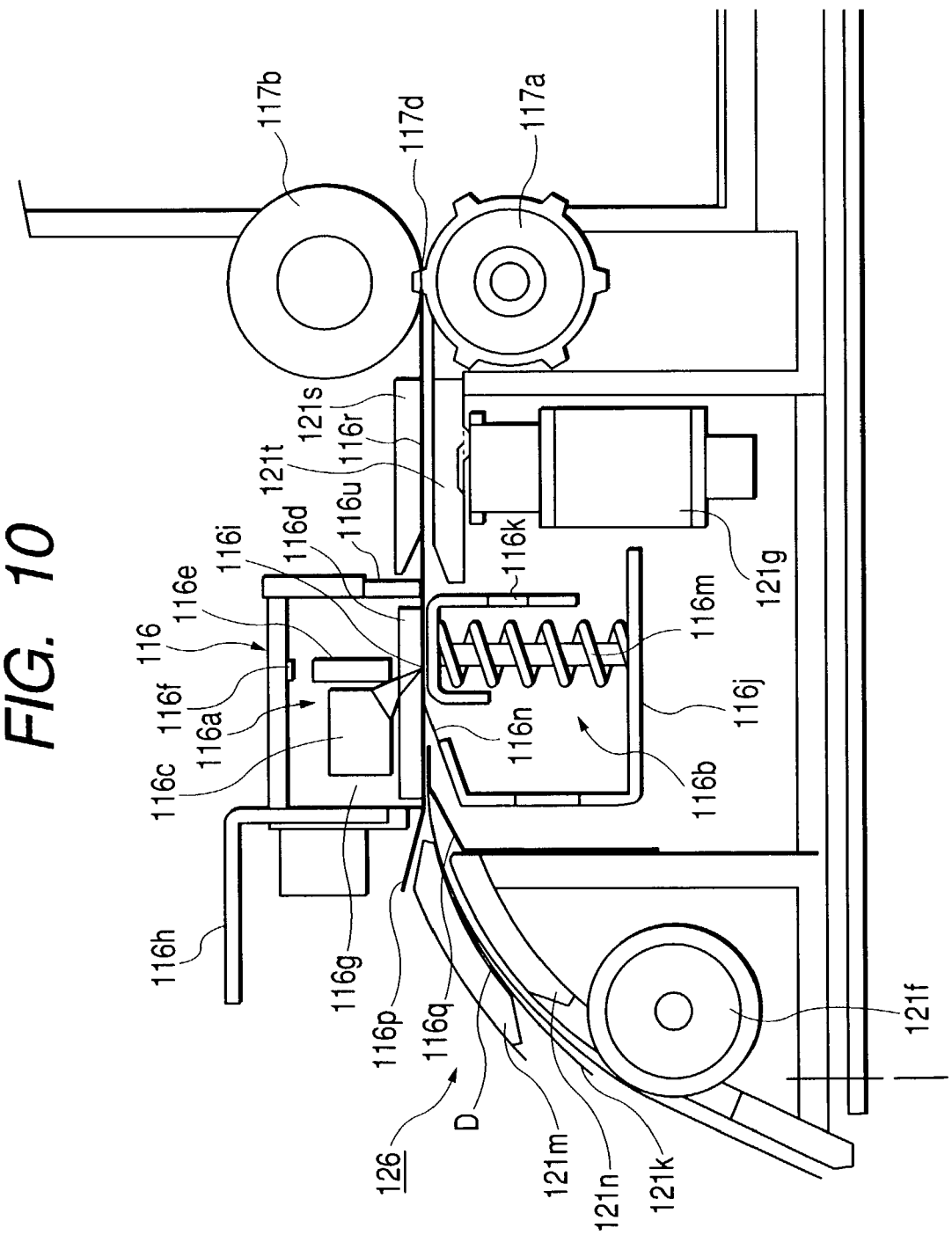
FIG. 10 is an enlarged view of the essential portions of the image reading apparatus provided in the facsimile apparatus of FIG. 6.

The contact image sensor 116a is adapted to apply light from a light source comprising an LED and a light conducting member made of resin or the like to the image on the sheet original or the book original, and cause reflected light reflected from the image to be imaged on a one-dimensional sensor element array by a SELFOC lens (trademark) and read the image. The number of the light sources carried on the contact image sensor 116a is one (one-side light source) as shown in FIG. 10. This is because the object to be read by the contact image sensor 116a is limited to a sheet original and therefore it is difficult for it to be affected by the shadow or external light due to the directionality of the light source occurring when a three-dimensional object is read. By using a single light source, it becomes possible to compactly construct the contact image sensor 116a portion. As contrasted with this, the movable type image sensor portion 108 has two light sources (two-side light source), as shown in FIG. 8. Thus, it is more difficult for the movable type image sensor portion 108 than for the contact image sensor 116a to be affected by much external light applicable to the reading surface thereof and less shadow is created when the movable type image sensor portion 108 reads a three-dimensional object.

The original stack stand 106 is fixed to the ADF pressure plate 102. The original stack stand 106 is provided with a slider 106a movable in a direction perpendicular to the feeding direction of the sheet original D (the widthwise direction of the sheet original D). The slider 106a is adapted to be capable of truing up the two sides of the sheet originals D stacked on the original stack stand 106 by the user.

On the original stack stand 106, there is disposed an original length detecting sensor 106b for detecting the length of the sheet originals D set thereon. Also, in the ADF separating portion 115, a plurality of original width detecting sensors 115d for detecting the pressure or absence of stacked sheet originals D and the width of the sheet originals D are disposed in the cross direction of the sheet originals D. The design is made such that the size and set direction of the original can be detected by a combination of the detection outputs of the original width detecting sensor 115d and an original length detecting sensor 106b.

In the sheet original feeding portion 121, there are disposed an original feed detecting sensor 121j and an original edge detecting sensor 121h. The original feed detecting sensor 121j is adapted to detect whether the sheet original D has been moved away from the ADF separating portion 115 and to detect the passage of the trailing edge of the sheet original D. The original edge detecting sensor 121h is adapted to detect the passage of the leading edge and trailing edge of the sheet original D. The detection signals are adapted to be used for the control of the timing of reading.

As described above, the back side reading sensor portion 116 is disposed above the original presser plate 118 and below the slider 106a to the ADF separating portion 115, whereby the ADF separating portion 115, the sheet original feeding portion 121 and the original delivery portion 117 can be compactly arranged, and the original glass stand 107 and the flow reading glass 109 can be disposed in proximity to each other to thereby narrow the width (the left to right width as viewed in FIG. 2) of the image reading portion 103.

By doing as described above, there can be provided a construction in which a wide installation area is not required for the image reading apparatus 126 and the two sides of the sheet original D can be read in one feeding cycle and the reading of the book original is also possible.

Also, the original stack stand 106 is fixed to the ADF pressure plate 102, whereby the ADF pressure plate 102 can be reinforced by the strength of the original stack stand 106 and the number of members for reinforcing the ADF pressure plate 102 can be reduced. Thereby, the ADF pressure plate 102 can be made light in weight, and the user can easily open and close the ADF pressure plate 102 when he or she places sheet originals or a book original on the original glass stand 107.

(Electrophotographic Printer)

Figure 7:
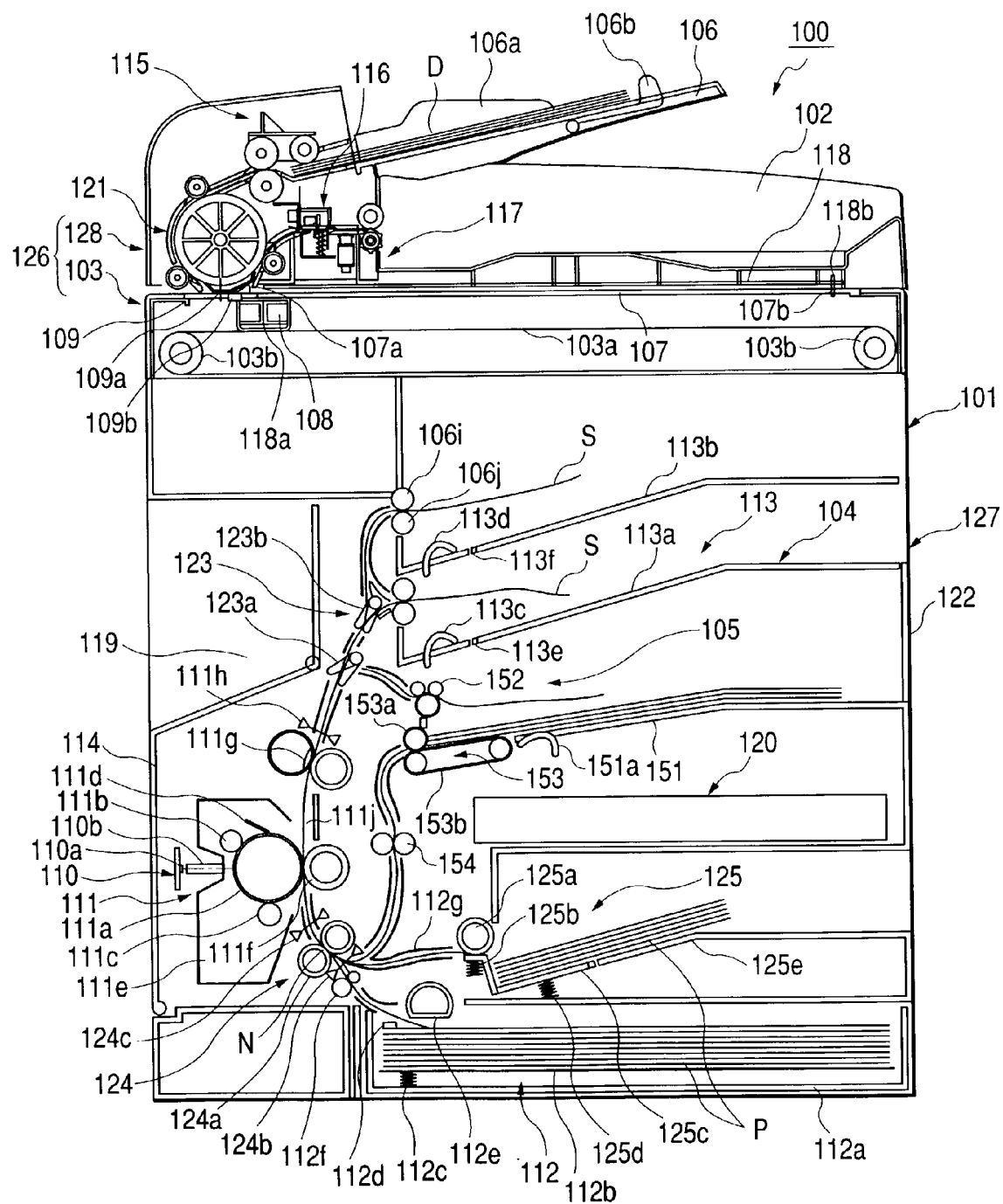
FIG. 7 is a schematic front cross-sectional view of the facsimile apparatus of FIG. 6.

In FIG. 7, the main body 104 of an electrophotographic printer 127 using an LED array is provided with an LED head unit 110, an image forming portion (image forming means) 111, a cassette sheet supplying portion 112, a recording sheet delivering portion (recording sheet stacking means) 113 designed to be capable of stacking a plurality of recording sheets P on the upper portion of the main body 104 of the printer, a cartridge cover 114, the joint portion 119 of an image reading portion 103 and the main body 104 of the printer, a controlling portion 120 for a facsimile apparatus 100, a duplex feeding portion cover 122, a feeding direction switching portion 123, a registration feeding portion 124, an MP (multi-paper) supplying portion 125 disposed in the main body 104 of the printer, and a duplex feeding portion 150.

The recording sheets are sheets on which characters, pictures, symbols, etc. (hereinafter referred to as the "images") are formed. The recording sheets include plain paper, thin resin sheets which are substitutes for plain paper, thick paper, paper for a overhead projector, etc.

The cassette sheet supplying portion 112 is disposed on the bottom of the main body 101 of the apparatus. The recording sheets P contained in a sheet supplying cassette 112a are stacked on an intermediate plate 112b and are upwardly biased by an intermediate plate spring 112c, and have the leading edge of their upper surface received by a separation claw 112d. A semi-circular sheet supplying roller 112e is disposed above the sheet supplying cassette 112a. The recording sheets P are pushed against the separation claw 112d by the rotation of the sheet supplying roller 112e, and are separated one by one (the claw separation method), and thereafter are fed to the registration feeding portion 124 by a pair of cassette feed rollers 112f. The thus fed recording sheet P has its leading edge detected by a registration sensor 124b a predetermined time after. If the leading edge of the recording sheet P is not detected by the registration sensor 124b within a predetermined time after sheet supply has been started, the controlling portion 120 judges that a jam has occurred, and stops the recording operation, and indicates to an operating portion 105 that jam has occurred.

If the leading edge of the recording sheet P is detected by the registration sensor 124b within the predetermined time after sheet supply has been started, the recording sheet P continues to be fed by the pair of cassette feed rollers 112*f* and is guided to the pressure contact nip N between a pair of registration rollers 124*a*.

The pair of registration rollers 124*a* are stopped from rotating by the controlling portion 120 at a point of time whereat the leading edge of the recording sheet P has arrived at the pressure contact nip N between the pair of registration rollers 124*a*. The leading edge of the recording sheet P strikes against and is received by the pressure contact nip N between the pair of registration rollers 124*a* which are now stopped form rotating. The recording sheet P, however, continues to be fed by the pair of cassette feed rollers 112*f* still thereafter. Therefore, flexure (loop) is created in the recording sheet P and by the reaction force of the flexure, the leading edge of the recording sheet P is brought into pressure contact with the pressure contact nip N. As the result, the leading edge of the recording sheet P becomes parallel to the pressure contact nip N, and the state of the recording sheet P changes from a skew state to a straight state. Thereafter, the pair of registration rollers 124*a* are rotated by predetermined control timing, whereby the recording sheet P is fed.

The recording sheet P being fed has the position of its leading edge detected by a TOP sensor 124*c*, and is timed with an image output so that the leading edge of a toner image formed on the photosensitive drum 111*a* of the image forming portion 111 and the leading edge of the recording sheet P may coincide with each other, whereafter the recording sheet P is fed to between a transfer charger 111*f* and the photosensitive drum 111*a*.

Images are recorded on the undersides of the recording sheets P stacked on the sheet supplying cassette 112*a*, in the image forming portion 111. The number of sheets stackable on the sheet supplying cassette 112*a* is about 250 sheets. The sheet supplying cassette 112*a* is designed to be pulled out toward the front face relative to the main body 101 of the apparatus (the front loading type).

Also, the facsimile apparatus 100 of the present embodiment has a multi-paper (MP) sheet supplying portion 125 in the main body 104 of the printer. The MP sheet supplying portion 125 has a fixed MP tray 125*e* on which the recording sheets P are stacked. An MP intermediate plate 125*c* is upwardly biased by an MP intermediate plate spring 125*d*. Usually, however, the MP intermediate plate 125*c* is depressed into a standby state by a cam (not shown).

The MP sheet supplying portion 125 rotates the cam (not shown) to thereby release the depression of the MP intermediate plate 125*c* when it receives a signal for starting MP sheet supply from the controlling portion 120 of the facsimile apparatus 100. The MP intermediate plate 125*c* is upthrust by an MP intermediate plate spring 125*d* and brings the recording sheets P into pressure contact with an MP sheet supplying roller 125*a*. An MP separation pad 125*b* is brought into pressure contact with the MP sheet supplying roller 125*a*. The MP sheet supplying roller 125*a* and the MP separation pad 125*b* separate the recording sheets P one by one and feed them (the frictional piece separation type).

The recording sheets P stacked on the MP intermediate plate 125*c* are also fed to the registration feeding portion 124 and have their skew feed corrected to a straight feed, and then images are formed thereon by the image forming portion 111.

Images are recorded on the undersides of the recording sheets P stacked on the MP tray 125*e*, in the image forming portion 111. The number of sheets stackable on the MP sheet supplying portion 125 is about 100 sheets. The MP sheet supplying portion 125 is of the frictional piece separation type and is therefore adapted to be capable of supplying also postcards or the like to the image forming portion 111.

Also, the cassette sheet supplying portion 112 and a second stage cassette sheet supplying portion (not shown), which is similar to the cassette sheet supplying portion 112 are capable of being separated from and coupled to each other as option. The number of sheets stackable on the entire apparatus is variable from about 350 sheets to about 600 sheets. The recording sheets P fed from the second stage cassette sheet supplying portion are fed to the registration feeding portion 124 through a sheet path 112*g* from the second stage cassette.

The photosensitive drum 111*a*, together with a primary charger 111*b*, a developing roller 111*c*, a cleaning blade 111*d*, etc., is integrally incorporated in a recording cartridge 111*e*. The recording cartridge 111*e* is detachably mounted in the main body 101 of the apparatus. The surface of the photosensitive drum 111*a* is adapted to be uniformly charged by the primary charger 111*b*. The charged surface of the photosensitive drum 111*a* is adapted to be irradiated with the light from a one-dimensional LED array 110*a* so that a latent image may be formed thereon. The latent image is adapted to be visualized by a toner supplied from the developing roller 111*c*. The effective light emission width of the one-dimensional LED array 110*a* is about 297 mm. Accordingly, the image forming portion 111 can form images on up to a recording sheet P of A3 size as definite sizes.

A transfer charger 111*f* is disposed in a portion around the photosensitive drum 111*a* of the image forming portion 111. Also, a heat fixing device 111*g* is disposed in a sheet feeding path downstream of the photosensitive drum 111*a*.

An image signal is outputted from the controlling portion 120 to an LED head unit 110. The one-dimensional LED array 110*a* of the LED head unit 110 emits a pixel corresponding to the image signal. The light emitted from the image forming apparatus passes through a lens portion 110*b* comprised of a SELFOC lens (trademark) and irradiates the photosensitive drum 111*a* to thereby form a latent image on the surface of the photosensitive drum 111*a*. Thereafter, a toner image is formed on the photosensitive drum 111*a* by the transfer charger 111*f*. The toner image is then transferred to the recording sheet P fed from the cassette sheet supplying portion 112 to the image forming portion 111. The recording sheet P, after the toner image has been transferred thereto, is guided by a sheet feeding portion 111*j* and is fed to the downstream side.

The sheet feeding portion 111*j* (guide means) is adapted to feed the recording sheet P so that the recording sheet P may be delivered to the first delivery portion 113*a*, the second delivery portion 113*b* and the duplex feeding portion 150 of a recording sheet delivery portion 113 with the image forming surface of the recording sheet P facing upwardly.

The recording sheet P fed along the sheet feeding portion 111*j* has the toner image thereon fixed by the heat fixing device 111*g*, and thereafter is fed to a feeding direction switching portion 123. A fixing sensor 111*h* is used for the detection of jam, the timing control, etc. in the image forming portion 111.

The recording sheet P has its direction of movement switched in the feeding direction switching portion 123 disposed at the joint portion 119 between the image reading portion and the main body of the recording apparatus. The recording sheet P is switch-operated by a signal from the controlling portion 120. By a first delivery flapper 123*a* and a second delivery flapper 123*b*, the recording sheet P is conveyed to one of the first delivery portion 113*a* the second delivery portion 113b and the duplex feeding portion 150 of the recording sheet delivery portion 113.

The photosensitive drum 111a is disposed on that side which is the upper side of the recording sheet P delivered to the first delivery portion 113a, the second delivery portion 113b and the duplex feeding portion 150 of the recording sheet delivery portion 113 and therefore, the recording sheet P conveyed to one of the first delivery portion 113a, the second delivery portion 113b and the duplex feeding portion 150 of the recording sheet delivery portion 113 is stacked with a formed image facing upwardly (a face-up state) at any position. The stacked recording sheets P, when removed, are adapted to be detected by recording sheet delivery tray sensors 113c, 113d and an intermediate tray sensor 151a.

A cartridge cover 114 is openably and closably provided on the main body 101 of the apparatus. The design is made such that when the cartridge cover 114 is opened, the recording cartridge 111e can be pulled out of the main body 101 of the apparatus and interchanged. Also, the cartridge cover 114 is provided with an interlock mechanism so that when the cartridge cover 114 is opened or the recording cartridge 111e is not set in the main body 101 of the apparatus, the main body 104 of the printer may not operate.

Also, the design is made such that if a jam occurs during the formation of an image on a recording sheet, when the cartridge cover 114 is opened, the recording sheet P stagnating in the apparatus can be taken out.

A description will now be provided of a case where images are recorded on the two sides of a recording sheet.

In case of two-side recording, an image is recorded earlier on the back side of the recording sheet, whereafter image information is recorded on the front side of the recording sheet.

The duplex feeding portion 150 is disposed in the upper portion of the main body 104 of the printer. The recording sheet P which has passed the heat fixing device 111g is guided by the first delivery flapper 123a on the basis of a control signal outputted from the controlling portion 120 and is conveyed to the duplex feeding portion 150. The recording sheet P conveyed to the duplex feeding portion 150 has its warp due to the heat and pressure applied by the heat fixing device 111g flattened by a pair of de-curler rollers 152, and thereafter is once stacked on an intermediate tray (sheet stacking means) 151.

After images have been formed on the back sides of a predetermined number of recording sheets, an image is formed on the front side of the recording sheet P stacked on the intermediate tray 151.

A refeed portion (inverting and feeding means) 153 is disposed below the pair of de-curler rollers 152. The refeed portion 153 is provided with a conveying belt 153b and a reversely rotated separation roller 153a. The conveying belt 153b pulls out the recording sheets P stacked on the intermediate tray 151 in the order from the lowermost one, and separates them and conveys them to a pair of intermediate conveying rollers 154. The recording sheet P conveyed by the pair of intermediate conveying rollers 154 is conveyed to a pair of registration rollers 124a.

When the registration sensor 124b detects the leading edge of the recording sheet P within a predetermined time after the conveyance of the recording sheet has been started, the recording sheet P continues to be conveyed by the pair of intermediate conveying rollers 154 and is guided to the pressure contact nip portion N between the pair of registration rollers 124a.

Thereafter, the recording sheet P continues to be subjected to the recording operation as previously described and an image is recorded on the front side thereof, whereafter the recording sheet P is stacked on the first delivery portion 113a or the second delivery portion 113b of the recording sheet delivery portion 113 by the guide of the first delivery flapper 123a.

The first delivery portion 113a and the second delivery portion 113b are formed of a transparent or translucent material, and are upwardly pivotally movable about hinge portions 113e and 113f, respectively. Also, the design is made such that by a duplex feeding portion cover 122 being forwardly opened, work in the duplex feeding portion 150 becomes easier to do.

By constructing the electrophotographic printer 127 as described above, it is not necessary to widen the installation area of the facsimile apparatus. Also, the recording sheet on which an image has been recorded is stacked on the duplex feeding portion 150 with its recording surface facing upwardly and therefore, the user can easily perform the confirmation and taking-out of the recorded image.

Further, the intermediate tray 151 in the main body is adapted to stack thereon recording sheets on which images have been formed and also, to once stack thereon a recording sheet on one side of which an image has been formed when images are to be formed on the two sides of the recording sheet and therefore, can be used effectively and the user can easily perform the confirmation and taking-out of the recorded image.

The aforedescribed image reading apparatus 126 is disposed above this electrophotographic printers 127, whereby there can be provided a facsimile apparatus which is capable of performing two-side reading and two-side recording and is also capable of reading book originals and which is small in installation area.

Figure 9:
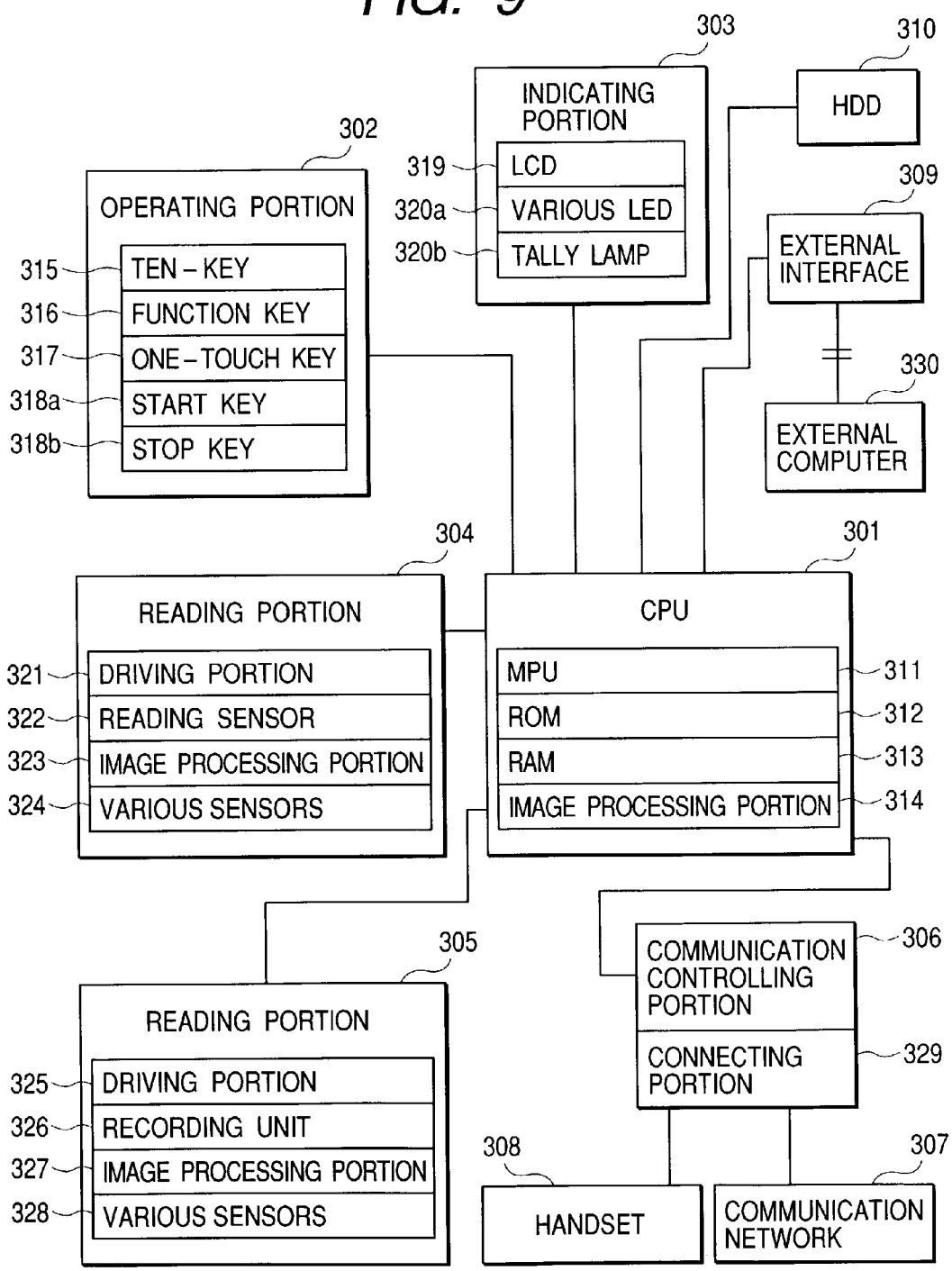
FIG. 9 is a control block diagram of the facsimile apparatus of FIG. 6.

FIG. 9 is a block diagram of the control system 300 of the facsimile apparatus 100 of the present embodiment. In FIG. 9, a CPU 301 is adapted to control the entire facsimile apparatus. The CPU 301 is constituted by an MPU 311, a ROM 312 for storing the control program, etc. of the MPU 311 therein, a RAM 313 used as a work area for processing various data and a temporary storing portion for image information, an image processing portion 314 for effecting the magnification change (zooming) of an image and the conversion of resolution or the like.

Also, the CPU 301 is provided with a calendar comprising a conventional construction, a timepiece function, etc. Of the storing areas of the RAM 313, an area for storing therein important system setting information such as one-touch key address information and software switch information is protected from unexpected hindrance such as power failure by battery backup. The control system of the facsimile apparatus is constructed by the above-described CPU 301 and the following elements 302 to 310 being coupled together through an interface.

An operating portion 302 is comprised of various key switches such as a ten-key 315, a function key 316, a one-touch key 317, a start key 318a and a stop key 318b. An indicating portion 303 is comprised of an LCD 319 for effecting the indication of various messages, various LEDs 320a for effecting the indication of a transmission mode, etc., a tally lamp 320b for informing a remote operator of the communication state and the occurrence of hindrance, etc.

A reading portion 304 is comprised of a driving portion 321 such as a reading motor, a reading sensor 322 for effecting the reading of an image, an image processing portion 323 for effecting the shading and binarization of the read image, various sensors 324 for effecting the detection or the like of an original, etc. A recording portion 305 is comprised of a driving portion 325 such as a recording motor, a recording unit 326 for effecting the control or the like of a laser scanner and the electrophotographic process, an image processing portion 327 for effecting the smoothing or the like of an image to be recorded, various sensors 328 for effecting the detection of a recording sheet or the like, etc.

A communication controlling portion 306 for effecting call-out, call-in, the encoding of image data, etc. has a connecting portion 329 comprising a MODEM, an NCU, etc. A communication network 307 and a handset 308 are connected to the connecting portion 329. A CPU external interface 309 is an interface for directly effecting the transmission and reception of data with the CPU 301, and enables the facsimile 100 to be used as the scanner printer or the like of an external computer 330, for example, by being connected to the computer 330 outside the apparatus by a connecting method of the interface standard such as RS-232C, SCSI or LAN (such as Ethernet (registered trademark). HDD 310 is adapted to be used as a nonvolatile memory of a large capacity for the preservation of image information, etc.

When the images of a plurality of pages are to be recorded, the CPU 301 is adapted to control each portion so as to once accumulate the images of all the pages in the RAM 313 or the HDD 310 so that the order of the pages may become proper after stacking, and thereafter record from the last page. Also, when the partner machine during the reception of FAX or the external computer 330 can transmit image information from the last page, the design may be made such that during the reception of FAX, the CPU 301 changes the order of the pages of the images on the part of the partner machine or the external computer 330, and forms images in the order of the pages on the part of the facsimile apparatus. Also, the CPU 301 is adapted to control each portion so that when two-side recording is to be effected, images may be recorded on the recording sheets with the back side pages earlier and the front side pages later as the order of recording.

When the facsimile apparatus 100 of the present embodiment is used as a copying machine, the image reading apparatus 126 reads the two sides of a sheet original at a time by one reading operation and therefore, if the feeding speed of the sheet original D during the reading is the same, the facsimile apparatus 100 can quickly finish reading a bundle of sheet originals as compared with a system for inverting the sheet original D to thereby read one side thereof at a time, and when images are to be formed on the two sides of a recording sheet by the electrophotographic printer 127, the waiting time until recording is started can be shortened to thereby shorten the processing times such as the total image reading time and the image forming time.

The back side reading sensor portion 116 will now be described with reference to FIG. 10. The contact image sensor 116a has a light source 116c comprising an LED (not shown) and a light conducting member made of resin or the like, contact glass 116d, a SELFOC lens 116e and a one-dimensional sensor element array 116f, and is held by a CS frame 116g. The CD frame 116g is fixed to the ADF pressure plate 102 through a CS mounting plate 116h.

The sheet original pressure portion 116b is provided with a pressure stay 116j, a pressure metal plate 116k supported for vertical movement relative to the pressure stay 116j, a white ground plate spring 116m for biasing the pressure metal plate 116k toward the contact image sensor 116a, a reading white ground plate (white film) 116n comprising a white flexible sheet (made of e.g. white polyester film having a thickness of about 0.1 mm), etc.

The reading white ground plate 116n is adhesively secured by an adhesive double coated tape in such a manner as to be astride the pressure stay 116j and the pressure metal plate 116k. The sheet original pressure portion 116b, when the sheet original D passes between the reading white ground plate 116n and the contact glass 116d, is adapted to press the sheet original D against the contact glass 116d with a predetermined pressure force.

A description will now be provided of the sheet feeding paths before and behind the back side reading sensor portion 116.

A back side reading sensor upstream feeding path 121k is formed chiefly by curved back side upstream guides 121m and 121n. The contact image sensor 116a is disposed at the terminal point of a sheet original feeding path curved into an S-shape.

The feeding path (original guide path) 116r from a back side original reading position 116i to the nip 117d between a delivery runner 117a and a delivery roller 117b is formed into a straight shape. Above and below the feeding path 116r, there are disposed back side downstream guides (guide walls) 121s and 121t for guiding the sheet original D.

As described above, the back side upstream guides 121m and 121n are curved and the feeding path 116r is formed into a straight shape, whereby the following features are created in the image reading apparatus 126.

The sheet original D is pressed against the contact glass 116d side by the reaction force due to its own flexure, and thus assist in the pressing by the white ground plate spring 116m, and closely contacts with the contact glass 116d and has its image read reliably.

Also, the horizontal distance from the sheet original reading position 109a to the back side original reading position 116i can be shortened, and the horizontal length of the image reading apparatus 126 in the feeding direction of the sheet original D can be shortened.

Further, when the mark of completed reading is to be stamped on the rear end portion of the sheet original D by the stamp 121g, the sheet original D is held straight because the feeding path 116r is straight, and the stamping body of the stamp 121g reliably contacts with the sheet original as a whole without partially contacting, and can reliably stamp the mark of completed reading on the sheet original D.

When the mark of completed reading is to be stamped on the sheet original D by the stamp 121g, if the feeding of the sheet original is controlled so that stamping may be effected with the sheet original D stopped in a state in which the trailing edge of the sheet original D is in a range downstream of the back side original reading position 116i and subjected to the pressing by the white ground plate spring 116m, a moderate holding force will act on the sheet original D and a good stamping state can be obtained.

Between the back side upstream guides 121m, 121n and the contact image sensor 116a, there are disposed a CS guide sheet (guide plate) 116p comprising a flexible sheet (e.g. polyester film having a thickness of 0.1 mm) adhesively secured to the contact glass 116d, and a CS entrance sheet (guide plate) 116q adhesively secured to the back side upstream guide 121n. The CS entrance sheet 116q comprising a flexible sheet (e.g. polyester film having a thickness of 0.2 mm) is brought into pressure contact with the CS guide sheet 116p.

Therefore, the CS guide sheet 116p and the CS entrance sheet 116q not only guide the sheet original D, but also nip it therebetween with a predetermined nipping force and apply a brake to the sheet original D and therefore, the design is made such that when the trailing edge of the sheet original D has passed the back side upstream guide 121*m* portion, the feeding speed of the sheet original D is not suddenly varied so that the read image may not be disturbed. At that time, the CS entrance sheet 116*q* presses a position at which the back side of the CS guide sheet 116*p* is adhesively secured to the contact glass 116*d* and therefore, the CS guide sheet 116*p* is not deformed by the pressure force of the CS entrance sheet 116*q*, but can form a stable guide shape.

Also, the image reading apparatus 126 has the reading white ground plate 116*n*, the CS guide sheet 116*p* and the CS entrance sheet 116*q* subjected to the antistatic treatment and further, has a grounded charge eliminating brush 116*a* downstream of the contact image sensor 116*a* and therefore, can prevent the malfunctioning of the contact image sensor 116*a* and the electrostatic attraction of the sheet original D which would otherwise be caused by excessively great static electricity being accumulated in the sheet original D.

The method of recording an image on the recording sheet may be other electrophotographic method such as the laser beam method, or need not be the electrophotographic method.

Also, while a description has been provided of a case where the two sensors of a one-to-one magnification optical system using a SELFOC lens are used as the image reading sensor, one or both of them may be replaced by the image reading sensor of a reduction optical system.

Further, the present invention can also be applied to an apparatus in which sheet originals are not stacked with their recording sides facing upward.

As described above, the image reading apparatus which is the second embodiment has second image reading means, stamping means and delivering means, these means being disposed above first image reading means, and has an original guide path formed into a straight shape, whereby the size thereof in the original feeding direction can be made compact and the protrusion length of the delivered original in the delivery direction thereof can be shortened and therefore, the number of means, e.g. feeding rollers, for feeding the sheet original can be reduced, and the construction of the apparatus can be simplified and the cost thereof can be reduced.

What is claimed is:

1. An image reading apparatus comprising:
   an original feeding path;
   a first original reading device configured and positioned to read one side of an original guided by said original feeding path; and
   a second original reading device disposed downstream of said first original reading device and configured and positioned to read the other side of the original,
   wherein said original feeding path is defined by a first original guide opposed to a reading surface of said second original reading device and a second original guide opposed to said first original guide, and
   wherein said first original guide and said second original guide are bent between said first original reading device and said second original reading device to shield said second original reading device from light used for reading the one side of the original by said first original reading device and to shield said first original reading device from light used for reading the other side of the original by said second original reading device.

2. An image reading apparatus according to claim 1,
   wherein said first original reading device comprises a first light source and a first photoelectric transfer element configured and positioned to receive light reflected from the original from said first light source,
   wherein said second original reading device comprises a second light source and a second photoelectric transfer element configured and positioned to receive light reflected from the original from said second light source, and
   wherein said first original guide and said second original guide are bent so as to bend said original feeding path for guiding the original so that rays from said first light source of said first original reading device do not enter said second photoelectric transfer element of said second original reading device, and rays from said second light source of said second original reading device do not enter said first photoelectric transfer element of said first original reading device.

3. An image reading apparatus according to claim 1, wherein when said first original reading device reads an original resting on an original glass stand, said first original reading device is moved in a sub-scanning direction to scan the original.

4. An image reading apparatus according to claim 2, wherein said second original reading device is fixed downstream in the original feeding path with respect to the reading position in which said first original reading device is stopped to read a moving original.

5. An image reading apparatus according to claim 1, wherein said first original reading device is an image reading device of a reduction optical system having a photoelectric transfer element, or image reading device having a contact image sensor.

6. An image reading apparatus according to claim 5, wherein said second original reading device is an image reading device of a reduction optical system having a photoelectric transfer element, or image reading device having a contact image sensor.

7. An image reading apparatus according to claim 1, wherein said first original guide and said second original guide have a stepped portion between said first original reading device and said second original reading device so that a portion of each of said first original guide and said second original guide downstream of said stepped portion is high with respect to a portion of each of said first original guide and said second original guide upstream of said stepped portion, and said stepped portion becomes a shielding portion to shield said second original reading device from light used for reading the one side of the original by said first original reading device and to shield said first original reading device from light used for reading the other side of the original by said second original reading device.

8. An image reading apparatus according to claim 1, wherein said first original reading device and said second original reading device are disposed in parallel with each other.

9. An image reading apparatus according to claim 8, wherein said image reading apparatus moves the original at a certain time so that the original is a moving original at a certain time and stops the movement of the original at certain times so that the original at certain times is a stationary original, said apparatus further comprising:
  a rigid member; and
  a pressure plate configured and positioned to bias the stationary original resting on an area in which said first original reading device scans the stationary original while moving,
wherein the pressure plate is provided in said rigid member,
wherein said second original reading device is provided in said rigid member,
wherein said pressure plate is provided with a rotary shaft perpendicular to a main scanning direction of said second original reading device, and
wherein said second original reading device is mounted for pivotal movement perpendicular to a main scanning direction of said first original reading device, relative to a housing of said first original reading device.

10. An image reading apparatus according to claim 9, wherein when said pressure plate is pivotally moved and joined to the housing of said first original reading device, said bent portion of each of said first and second original guides shields said second original reading device from light used for reading the one side of the original by said first original reading device and shields said first original reading device from light used for reading the other side of the original by said second original reading device and is provided on said rigid member.

11. An image reading apparatus according to claim 1, further comprising a biasing member, which biases the original in a reading portion in which said first original reading device reads the original guided by said original feeding path, wherein an original feeding portion provided with said biasing member, said second original reading device, and said second original guide is rotatable about a rotary axis parallel to said second original reading device so that said biasing member is separated from said first original reading device and said second original guide is separated from said first original guide.

* * * * *

UNITED STATES PATENT AND TRADEMARK OFFICE
CERTIFICATE OF CORRECTION

| | |
|---|---|
| PATENT NO. | : 7,202,983 B2 |
| APPLICATION NO. | : 10/222823 |
| DATED | : April 10, 2007 |
| INVENTOR(S) | : Masahiko Yokota et al. |

It is certified that error appears in the above-identified patent and that said Letters Patent is hereby corrected as shown below:

ON THE TITLE PAGE:
At Item (56), Foreign Patent Documents, "JP 2001251474 A 9/2001" should read --JP 2001-251474 A 9/2001--, and "JP 07193680 7/1995" should read --JP 7-193680 7/1995--.

COLUMN 4:
Line 50, "path 60b 1" should read --path 60b1--.

COLUMN 7:
Line 63, "type; In" should read --type: In--.

COLUMN 10:
Line 24, "for example," should read --for example, of--.

COLUMN 12:
Line 38, "into" should be deleted.
Line 61, "121fbiased" should read --121f biased--.

COLUMN 14:
Line 43, "a overhead" should read --an overhead--.
Line 64, "jam" should read --a jam--.

COLUMN 15:
Line 11, "stopped form" should read --stopped from--.
Line 28, "to" should be deleted.

COLUMN 17:
Line 30, "In case" should read --In the case--.

COLUMN 18:
Line 29, "printers" should read --printer--.

COLUMN 19:
Line 20, "mark)." should read --mark)).--.

UNITED STATES PATENT AND TRADEMARK OFFICE
CERTIFICATE OF CORRECTION

PATENT NO.         : 7,202,983 B2
APPLICATION NO.    : 10/222823
DATED              : April 10, 2007
INVENTOR(S)        : Masahiko Yokota et al.

It is certified that error appears in the above-identified patent and that said Letters Patent is hereby corrected as shown below:

COLUMN 20:
Line 31, "assist" should read --assists--.

COLUMN 21:
Line 22, "other" should read --another--.

Signed and Sealed this

Twenty-seventh Day of May, 2008

JON W. DUDAS
*Director of the United States Patent and Trademark Office*